US012748475B2

(12) United States Patent
Gurnani et al.

(10) Patent No.: US 12,748,475 B2

(45) Date of Patent: Sep. 29, 2026

(54) INTELLIGENT AND ADAPTIVE SHARING OF POWER AMONG POWER DELIVERY PORTS

(71) Applicant: Cypress Semiconductor Corporation, San Jose, CA (US)

(72) Inventors: Jyotika Gurnani, Bhilwara (IN); Bhargav Teja Paleti, Bangalore (IN); Manaskant Dipakkumar Desai, Navsari (IN); Kailas Narayana Iyer, Karnataka (IN)

(73) Assignee: Infineon Technologies Americas Corp., El Segundo, CA (US)

(*) Notice: Subject to any disclaimer, the term of this patent is extended or adjusted under 35 U.S.C. 154(b) by 233 days.

(21) Appl. No.: 18/535,898

(22) Filed: Dec. 11, 2023

(65) Prior Publication Data

US 2025/0076952 A1 Mar. 6, 2025

Related U.S. Application Data

(60) Provisional application No. 63/536,195, filed on Sep. 1, 2023.

(51) Int. Cl.
*G06F 1/28* (2006.01)
*G06F 13/42* (2006.01)

(52) U.S. Cl.
CPC ............ *G06F 1/28* (2013.01); *G06F 13/4282* (2013.01); *G06F 2213/0042* (2013.01)

(58) Field of Classification Search
CPC ................. G06F 1/128; G06F 13/4282; G06F 2213/0042
See application file for complete search history.

(56) References Cited

U.S. PATENT DOCUMENTS

| | | | |
|---|---|---|---|
| 11,061,457 B1 | | 7/2021 | Bhattacharjee et al. |
| 11,604,501 B2 | * | 3/2023 | Bhagavathula ........ G06F 13/385 |
| 2007/0245161 A1 | * | 10/2007 | Shaw .................... G06F 1/3203 713/300 |
| 2012/0198119 A1 | * | 8/2012 | Johnson .............. G06F 13/4022 710/312 |
| 2015/0160674 A1 | * | 6/2015 | Burdette ............... G06F 13/385 700/295 |
| 2019/0171267 A1 | * | 6/2019 | Piwonka ................. G06F 13/38 |
| 2021/0208648 A1 | * | 7/2021 | Venkideswaran ............................ H02J 7/007192 |
| 2022/0113776 A1 | * | 4/2022 | Bhagavathula ......... G06F 1/266 |
| 2022/0171443 A1 | * | 6/2022 | Kumar .................. H02J 7/0042 |
| 2023/0409098 A1 | * | 12/2023 | Sivaramakrishnan ....................... G06F 1/3253 |

* cited by examiner

*Primary Examiner* — Nimesh G Patel

(57) ABSTRACT

Technology to intelligently and adaptive share power among charging ports of a multiport power delivery (PD) system is described. In some embodiments, a method includes monitoring power consumption by at least one device of a plurality of devices. Each device of the plurality of devices is connected to a port of a plurality of ports having an allocation of system power. Monitoring the power consumption includes obtaining at least one current measurement of actual current consumption by the at least one device. The method further includes determining whether the at least one current measurement satisfies a threshold condition, and responsive to determining that the at least one current measurement satisfies the threshold condition, causing the system power to be reallocated between each port of the plurality of ports.

17 Claims, 12 Drawing Sheets

INTELLIGENT AND ADAPTIVE SHARING OF POWER AMONG POWER DELIVERY PORTS

CROSS-REFERENCE TO RELATED APPLICATION(S)

The present application claims the benefit of U.S. Provisional Application No. 63/536,195, filed on Sep. 1, 2023 and entitled "INTELLIGENT AND ADAPTIVE SHARING OF POWER AMONG USB TYPE-C/PD PORTS", the entire contents of which are hereby incorporated by reference herein.

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. The USB-PD specification, however, allows power providers and power consumers to dynamically negotiate the levels of the provided voltages (V) and currents.

BRIEF DESCRIPTION OF THE DRAWINGS

The disclosure is illustrated by way of example, and not of limitation, in the FIGURES of the accompanying drawings.

DETAILED DESCRIPTION

Figure 1:
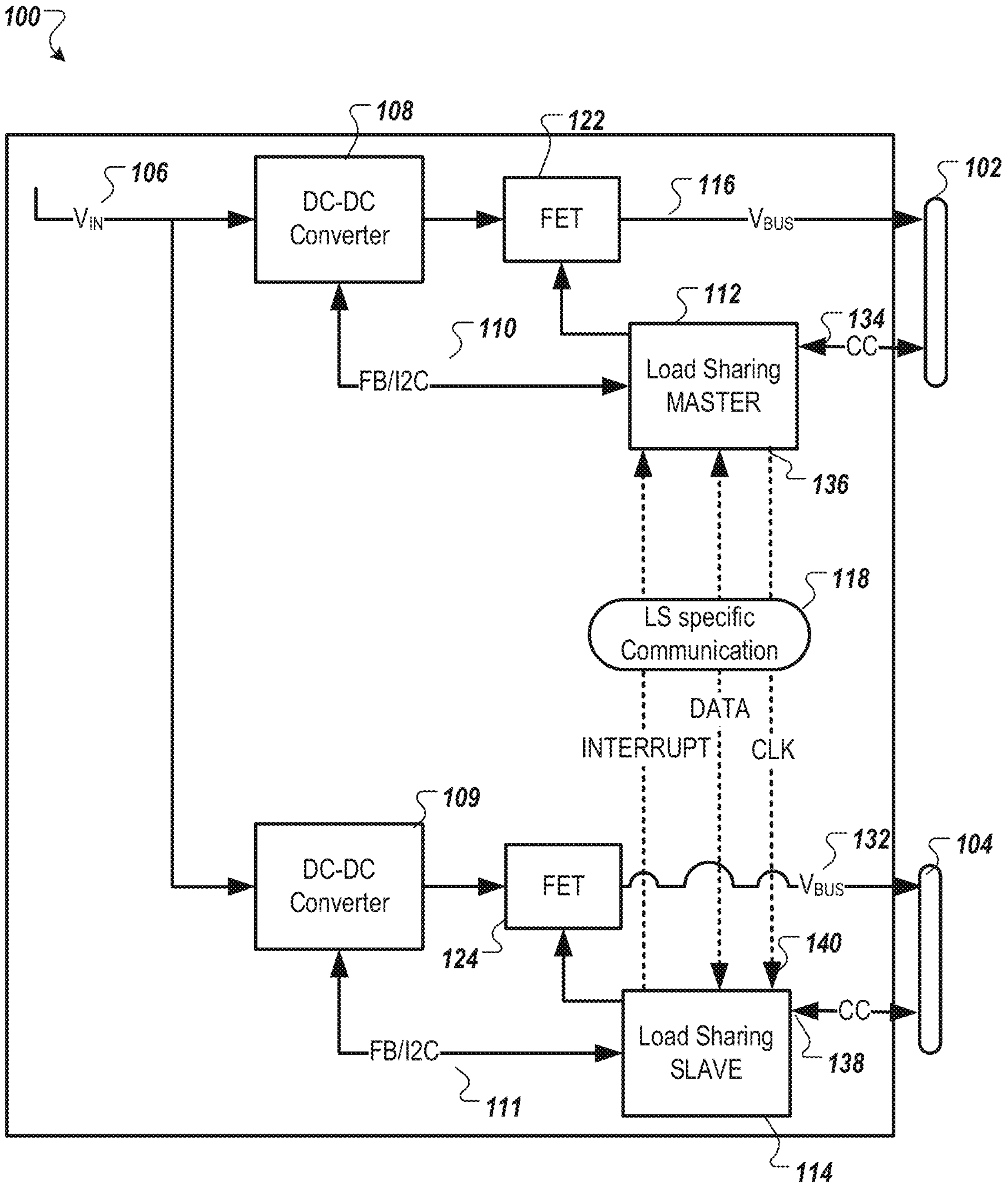
FIG. 1 illustrates a block diagram of a multiport power delivery (PD) system with a master port and a slave port, according to some embodiments.

The following description sets forth numerous specific details such as examples of specific systems, components, methods, and so forth, in order to provide a good understanding of various embodiments of the techniques described herein for intelligent and adaptive sharing of power among multiple power delivery ports. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of embodiments of the present invention.

Reference in the description to "an embodiment," "one embodiment," "an example embodiment," "some embodiments," and "various embodiments" means that a particular feature, structure, step, operation, or characteristic described in connection with the embodiment(s) is included in some embodiments of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for enabling intelligent and adaptive sharing of system power among multiple power delivery (PD) ports or multi-port controllers connected to electronic devices. In some embodiments, an electronic device is a Universal Serial Bus (USB)-enable electronic device that uses a Universal Serial Bus (USB) connector (interface) for communication, battery charging and/or PD. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity devices (e.g., hubs, docking stations, etc.), audio/video/data recording and/or playback devices (e.g., cameras, voice recorders, hand-held scanners, monitors, etc.), and other similar electronic devices. Embodiments described herein can be used in power-adapter solutions along with USB PD capability. Aspects of the present disclosure can enable a power source to have much lower capacity, thereby reducing cost and complexity, while continuing to efficiently employ the maximum charging potential of its multiple ports.

A USB-enabled electronic device or a system may comply with at least one release of a USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5 V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C (USB-C), is defined in various releases and/or versions of the USB Type-C specification. The USB-C specification defines Type-C receptacle, Type-C plug, and Type-C cables that can support USB communications as well as power delivery over newer USB power delivery protocols defined in various revisions/versions of the USB-PD specification. Examples of USB-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB-C connector, disposed as a standard Type-C plug or receptacle, provides terminals for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification. The USB-PD specification defines a standard protocol designed to enable the maximum functionality of USB enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power (or higher up to 240 W, in case of Extended Power Range, or EPR). According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc.

According to the USB-PD specification, an electronic device is typically configured to deliver power to another device through a power path configured on a USB VBUS line. The device that provides power is typically referred to as (or includes) a "provider" (or a power source), and the device that consumes power is typically referred to as (or includes) a "consumer" (or a power sink). A power path typically includes a power switch coupled in-line on the VBUS line and configured to turn the delivery of power on and off. In some embodiments, a USB-PD power source can be configured to draw power from a direct current (DC) power source, and can include a direct current-to-direct current (DC-DC) converter. In other embodiments, a USB-PD power source may be configured to draw power from an alternating current (AC) power adapter or from another AC source.

In some implementations of USB chargers with multiple USB ports (e.g., USB-C/PD chargers with multiple USB-C ports, power sharing solutions may be needed to match a port budget (PB) of power allocated to a USB port ("port"). Using a lower capacity power source, which provides a lower system power, can lead to faults when each port is utilizing its full power capability simultaneously. Additionally, for a given power source, increasing the capability of individual ports is not possible without increasing the system power or fuse rating. Some power sharing techniques are implemented with little to no adaptability, and use techniques such as fair sharing, first-come-first-serve, and/or limiting the power available to each port. In fair sharing, each port is allocated the same amount of power regardless of how many devices are connected or the power requirements of the connected devices. In first come-first-serve, the first consumer device to connect will be allocated power based on its power requirement, but any subsequent consumer devices that are connected may not have their power requirements met. By limiting the power available to each port (e.g., to 15 W), power cannot be reallocated among other ports. In each of these techniques, failure detection between ports cannot be communicated. In another power sharing technique, an external controller, which is a separate controller from the USB-C/PD controllers coupled to the individual ports, can be implemented to allocate the PB. However, this technique may lack a fair share implementation, may not redistribute unused power, and may be limited to sharing power between two ports. Further communication failure between the external controller and the ports may not be detected.

Some power-sharing implementations use a load-sharing algorithm to distribute power among multiple ports based on Request Data Object (RDOs) received from sink devices that specify the respective devices' required power. These power-sharing implementations, however, do not account for the actual power consumed by each device; rather, the power-sharing is calculated on the basis of the initial RDOs instead of actual power consumed. As a result, multiple sink devices that charge at different rates can keep on changing the power they consume without changing the initially-requested RDO. For example, once a sink device is charged, power continues to be provided based on the initially requested RDO and is not redistributed in the system efficiently, which does not allow a sink device connected on another port to receive more power and to charge quicker. As sink devices can charge at different rates and keep on changing the power consumed without changing the RDO, there is a need of mechanism to redistribute the power for the efficient distribution of power in a multi-port system.

Described herein are various embodiments of techniques for enabling intelligent and adaptive power sharing among connected charging ports. In some embodiments, a port is a USB port (e.g., USB-C port). Embodiments described herein may address the above-mentioned and other challenges by providing techniques to sense the actual power consumed by the connected sink devices, if any, and to distribute the available system power intelligently among the multiple ports, independent of the connection sequence. Embodiments described herein can be used to reduce form factors and can be seamlessly integrated into existing designs by defining a power sharing master ("master") as a sole power-delivery decision maker and one or more power sharing slaves ("slaves") that respond to the power sharing master. Embodiments described herein can also facilitate run-time configuration of the master and slave roles based on system requirements, which can enable a symmetric firmware-based method, with little to no effect on data transfer or user experience. Power sharing ports are independent so they can continue to function if communication between the ports is broken. Embodiments described herein can further enable fair and intelligent redistribution of the available system power, can be resilient to communication failures, are scalable to systems with more than two ports, and can be compatible with a dynamic power throttling algorithm.

In some embodiments, at least one processing device senses a power requirement of at least one connected sink device, if any, and allocates or distributes power intelligently among ports connected to the at least one connected sink device. Once after system power is distributed, the at least one processing device can monitor power consumption by the at least one connected sink device and determine whether to redistribute (e.g., increasing and/or decreasing) the system power to any and/or all of the at least one connected sink device. In some embodiments, at least one processing device is configured to detect and store charging characteristics of a connected sink device and use the stored data from next time onwards to provide better charging experience for this particular sink device and also to perform an efficient and stable power sharing. This adaptive power distribution mechanism can be particularly useful for end users that repeatedly use the same system setup to charge the same devices, such as the same laptop, mobile phone, etc.

FIG. 1 is a block diagram of a multiport power delivery system 100 with a master port 102 and a slave port 104 according to one embodiment. The multiport PD system 100 can be a USB-C/PD system. A firmware-based method can enable sharing of system power among ports, such as master port 102 and slave port 104, of multiport PD system 100. Master port 102 is controlled by master controller 112, which is a sole PD decision maker, while slave port 104 is controlled by slave controller 114, which is a PD responder that can respond to commands initiated by master controller 112. Master controller 112 is also referred to as load sharing (LS) master controller 112, and slave controller 114 is also referred to as LS slave controller 114 herein. Master controller 112 is configured to obtain a port connection status of slave port 104 from slave controller 114. Master controller 112 is further configured to allocate fair share power to all ports. Master controller 112 and slave controller 114 can then perform power redistribution based on connected ports. In some embodiments, master port 102 and slave port 104 are identical. In some embodiments, master controller 112 and slave controller 114 are identical, except that master controller 112 is assigned (or otherwise programmed) by the firmware-based method to operate as the master to control slave controller 114 and slave controller 114 is assigned (or otherwise programmed) by the firmware-based method to operate as the slave and to respond to master controller 112.

Multiport PD system 100 has an input voltage VIN from a power source at input line 106. The power source provides system power (or total system power) to multiport PD system 100. Power converter 108 converts an input voltage to a different voltage to be supplied to master port 102. Power converter 109 converts the input voltage to a different voltage to be supplied to slave port 104. In some embodiments, power converters 108 and 109 can decrease the input voltage VIN to a lower voltage (e.g., referred to as a step down in voltage). Serial bus line 110 couples power converter 108 to LS master controller 112. Serial bus line 111 couples power converter 109 to LS slave controller 114. In the depicted embodiment, the power source, which is coupled to power converter 108 and power converter 109, supplies a system power to be allocated between master port 102 and slave port 104. Field effect transistor (FET) 122 may be toggled on or off to provide power to master port 102. LS master controller 112 provides a signal to toggle FET 122 on or off. FET 124 may be toggled on or off to provide power to slave port 104. LS slave controller 114 provides a signal to toggle FET 124 on or off. FETs 122 and 124 are coupled to master port 102 and slave port 104 by VBUS lines 116.

In some embodiments, power converters 108 can be linear DC-DC converters, switched DC-DC converters, AC-DC converters, or the like. Though depicted in FIG. 1 as DC-DC converters, power converters 108 can be implemented as AC-DC converters or other power converters. FETs 122 and 124 can be N-channel FETs, P-channel FETs, or the like. Master port 102 and slave port 104 can be USB Type-C ports, or other power-providing or power-receiving ports, and the like.

LS master controller 112 and LS slave controller 114 can be configured to communicate for load sharing (or power sharing) via communication interface 118. Communication interface 118 can be over a unidirectional clock (CLK) line where LS master controller 112 sends a clock signal to LS slave controller 114, a unidirectional interrupt line where LS slave controller 114 sends an interrupt signal to LS master controller 112, and a bidirectional data line where signals are sent between LS master controller 112 and LS slave controller 114. Communication interface 118 can be a serial communication interface such as I2C, recommended standard (RS)-232, RS-485, serial peripheral interface (SPI), Local Interconnect Network (LIN), or the like. The role of LS master controller 112 is to keep track of all port connection statuses, including a port connection status of its own port (master port 102) and a port connection status of slave port 104. In some embodiments, LS slave controller 114 notifies LS master controller 112 about the port connection status of slave port 104. In another embodiment, LS master controller 112 may query LS slave controller 114 about the port connection status of slave port 104. The port connection status may be an indication of whether a sink device is attached or connected to the port. If a sink device is connected to a port, the port is referred to as attached. If no sink device is connected to a port, the port is referred to as detached. LS master controller 112 can send commands to LS slave controller 114 to update the PD of slave port 104. In response to receiving a command from LS master controller 112, LS slave controller 114 triggers a PD change based on the received command. A sink device may be any device that is attached or connected to a port and consumes power from the port, such as a cell phone, tablet, laptop, or the like.

In some embodiments, LS master controller 112 includes a first terminal 134 coupled to master port 102 and a first set of terminals 136 coupled to communication interface 118. LS slave controller 114 includes a second terminal 138 coupled to slave port 104 and a second set of terminals 140 coupled to communication interface 118. LS master controller 112 and LS slave controller 114 are coupled and communicate via communication interface 118.

The commands sent by LS master controller 112 depend on the connection statuses of all ports of multiport PD system 100. LS master controller 112 may send a first type of command when all ports of multiport PD system 100 are disconnected, a second type of command when one port of multiport PD system 100 is connected, and a third type of command when more than one port of multiport PD system 100 is connected.

Some embodiments, which can be implemented on multiport PD system 100, may use symmetric firmware (FW) capable of dynamic detection of LS master controller 112 and LS slave controller 114. In these embodiments, LS master controller 112 can be dynamically configured as the sole PD power-sharing decision maker, and LS slave controller 114 can be dynamically configured as the responder. The LS master controller 112 is configured to detect or otherwise determine the full/total port power, and to redistribute the available/total system power based on the actual/live power consumption of the sink devices connected to ports 102 and 104. The power-sharing configuration of LS master controller 112 and LS slave controller 114 is such that in operation it ensures no adverse effect on any USB data communication and does not otherwise degrade the end-user experience. In addition, the power-sharing configuration provides support for any combination of PD ports and pure Type-C devices operation.

In some embodiments, a firmware-based method is executed to distribute a total system power (SP) among N ports independent of the sequence in which sink devices are attached to the ports. The total system power can be distributed without leaving any of the total system power unallocated. It is worth noting that although two ports are shown in FIG. 1, a multiport PD system can have some positive integer (N) number of ports, such as three, four, five, or more. Each port is capable of sourcing an individual port budget (PB) (also referred to as a port power herein). PB may be less than the total system power (SP), e.g., PB<SP. However, the total port power of all of the ports (N*PB) can be greater than the total system power, e.g., N*PB>SP, although the herein-described algorithm for adaptive and intelligent power sharing prevents the multiport PD system from outputting a power greater than SP. When all N ports are detached from sink devices, each of the N ports can be allocated a fair share amount of power, e.g., SP/N. When a sink device is attached to one port, the attached port can be allocated PB. A residual power, or an unused power, of the system is a difference between the system power and the PB of the connected port (e.g., SP−PB). The remaining detached ports (of which there are N−1) can be allocated a fair share amount of the residual power, e.g., (SP−PB)/(N−1), where N−1 represents the number of remaining disconnected ports. When more than one port is connected to a respective sink device, initially SP/N can be allocated to each port followed by a redistribution of unused power among the attached ports in accordance with the techniques described herein. If a port selects or is allocated less than SP/N amount of power, it may be referred to as a DOWN port herein. If a port selects or is allocated SP/N amount of power, it may be referred to an UP port herein. DOWN ports are reallocated a lower PD, creating residual power to be redistributed among the UP ports. The residual power is reallocated to UP ports in a fair share model.

LS master controller 112 can send messages to LS slave controller 114 to determine whether there is a communication failure between LS master controller 112 and LS slave controller 114. In some embodiments, the messages are heartbeat messages that LS master controller 112 sends to LS slave controller 114 at regular predetermined intervals. In some embodiments, the regular predetermined intervals may be a number of seconds and can be programmable. In another embodiment, the messages are heartbeat messages that LS master controller 112 sends to LS slave controller 114 at various points in time during the operation of multiport PD system 100. In some embodiments, heartbeat messages may not be at regular predefined intervals, for example if there are interim communication issues between LS master controller 112 and LS slave controller 114, or if there is a permanent communication breakdown. If LS slave controller 114 does not receive a heartbeat message in a first threshold amount of time, it determines that there is a communication failure between LS slave controller 114 and LS master controller 112. When LS slave controller 114 receives a heartbeat message, it sends an acknowledgement, or a heartbeat acknowledgement, to LS master controller 112. If LS master controller 112 does not receive a heartbeat acknowledgement in a second threshold amount of time, it determines that there is a communication failure between LS master controller 112 and LS slave controller 114. Once a communication failure is detected, both the PB of master port 102 and the PB slave port 104 are reduced to fair share, e.g., SP/N, if their previously allocated PB was greater than fair share.

The LS master controller 112 can determine whether a change of status of the master port 102 or the slave port 104 is valid or invalid. In some embodiments, the change of status may be determined to be valid if a user is attaching/detaching a sink device to the multiport PD system 100, if the sink device is no longer drawing power, or the like. In some embodiments, the change of status may be determined to be invalid if the sink device has a faulty connection to the multiport PD system 100, if the sink device malfunctions, or the like. In some embodiments, when at least one port (either the master port 102 or the slave port 104) is already attached, any subsequent port status change is considered valid if it is unchanged or stable after a threshold duration of time, referred to herein as tDebounce, is passed. tDebounce is a duration of time through which the port status change should remain consistent to be considered valid when at least one other port is already attached. If the port connection status is not consistent for the threshold duration of time, the change of the port connection status is ignored by the LS master controller 112. In some embodiments, tDebounce may be a number of milliseconds. Alternatively, tDebounce can be other amounts of time. Any power sharing specific PD update to the master port 102 or the slave port 104 happens only after tDebounce has passed. This allows the multiport PD system 100 to be resilient to a bad sink device connection or disconnection and prevents unnecessary power reallocations to already connected ports under such a scenario.

Although multiport PD system 100 is depicted in FIG. 1 as having one slave port, in other embodiments, the multi-port PD system can have a different number of slave ports, such as two, three, four, or other positive integer number, N ports. Although multiport PD system 100 is depicted in FIG. 1 as being a single device, the firmware-based method for intelligent and adaptive power sharing described herein can be implemented in multiple PD devices with a common power source.

Although the multiport PD system 100 is depicted in FIG. 1 as having a master controller with an associated master port and a slave controller with an associated slave port, in other embodiments the multiport PD system may have only a master controller that controls of all ports in the system. In such an embodiment, the master controller, to distribute power among the ports, sends commands directly to each respective port rather than to a slave controller.

Figure 2A:
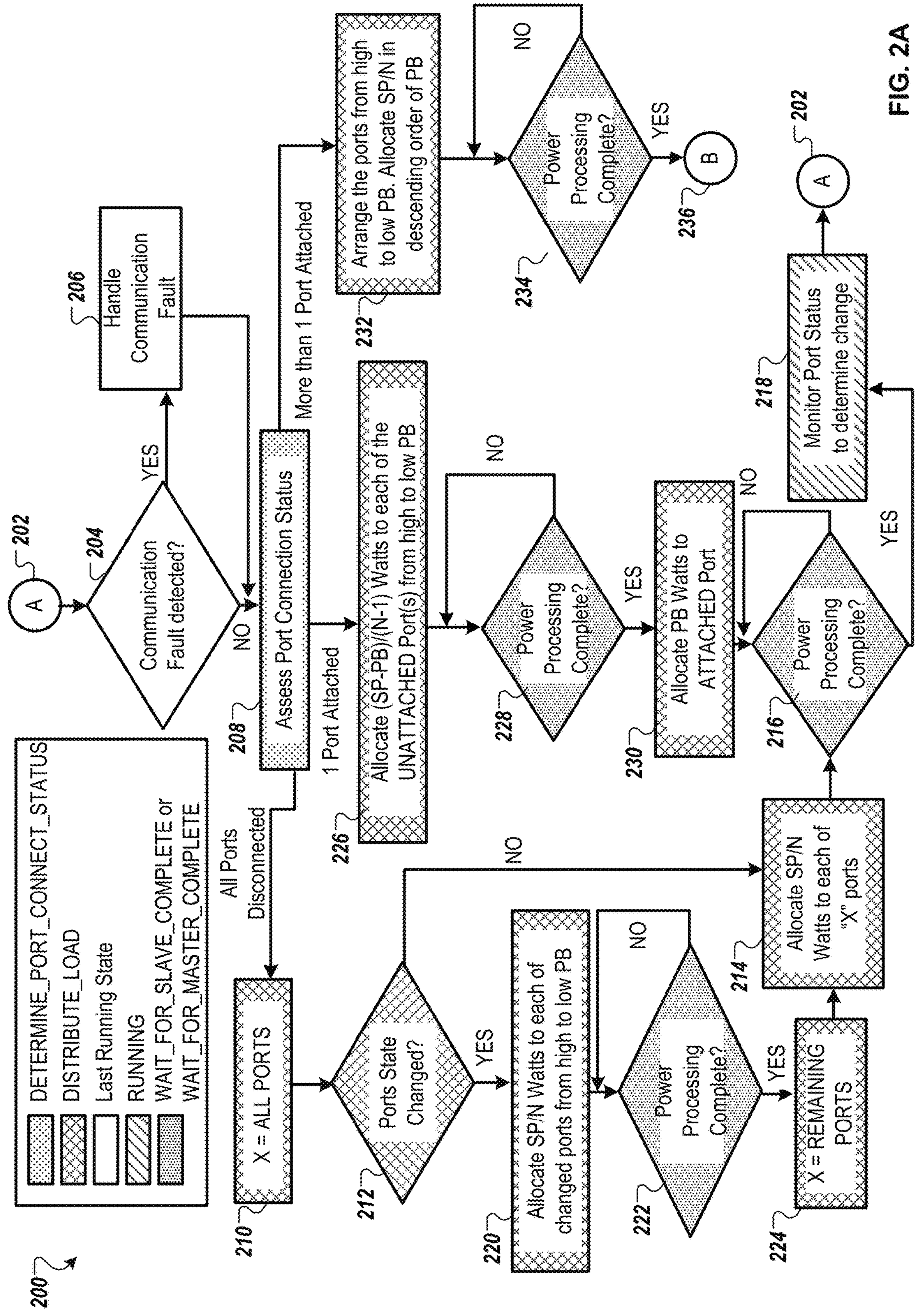
FIGS. 2A-2B collectively illustrate a flow diagram of a method of implementing intelligent power sharing among ports in a multiport PD system, according to some embodiments.
Figure 2B:
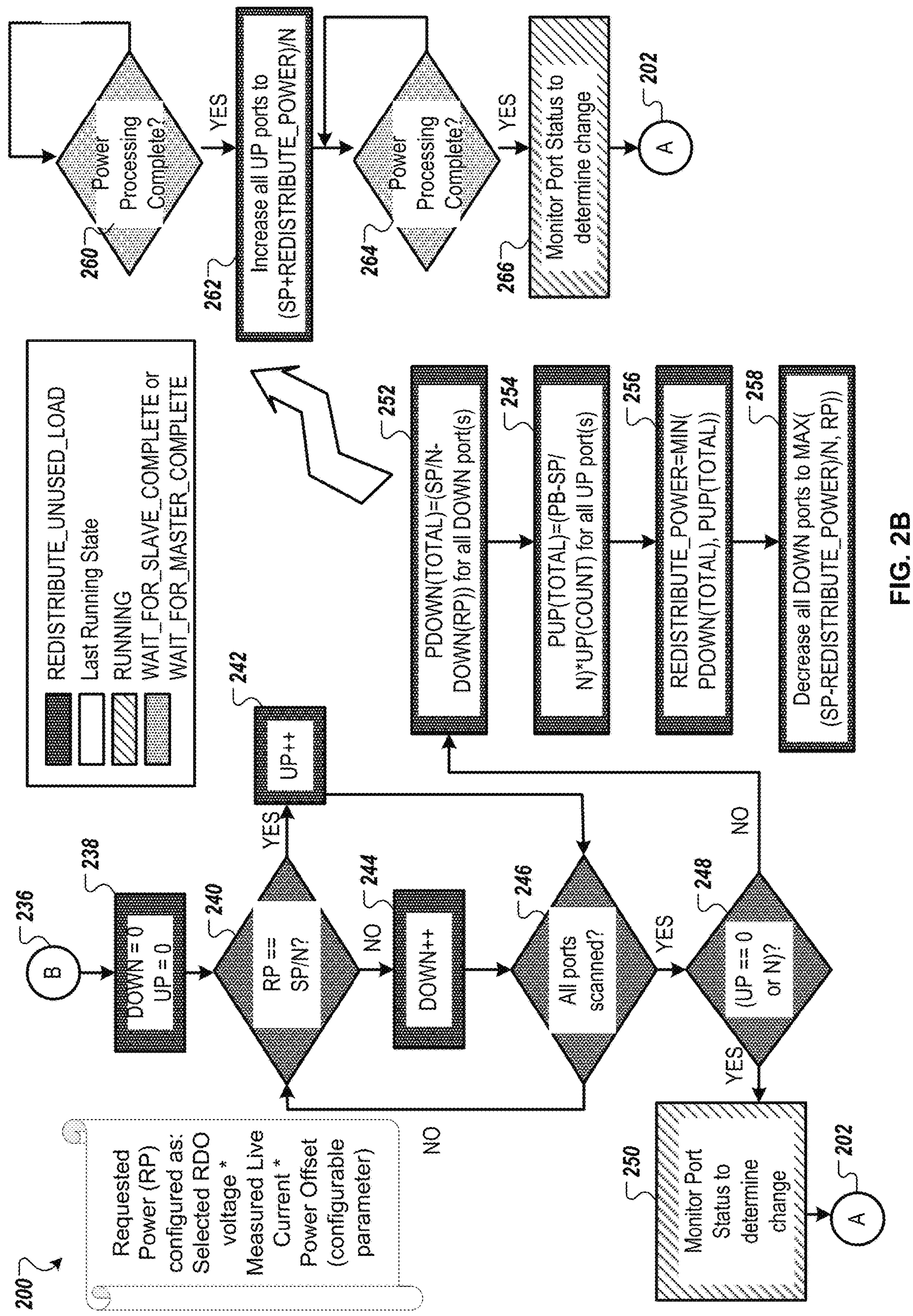

FIGS. 2A and 2B collectively illustrate a flow diagram of a method 200 of implementing intelligent power sharing among ports in a multiport PD system, according to some embodiments. The method 200 is executed on a LS master controller, in an example embodiment. The method 200 may be performed by processing logic that comprises hardware (e.g., circuitry, dedicated logic, programmable logic, micro-code, etc.), software, firmware, or a combination thereof. In some embodiments, method 200 may be performed by any of the processing devices described herein. In some embodiments, method 200 is performed by processing logic instantiated in a master controller, such as LS master controller 112 of FIG. 1. In some embodiments, the master controller executes a firmware-based method that performs the method 200. In another embodiment, the master controller has embedded code or logic and is configured to execute instructions to perform the illustrated operations.

The method 200 begins at point A 202, which represents a previously running state. In the previously running state, the master controller may be monitoring for a change of a port connection status of a port. The port connection status indicates whether a port has a sink device that is connected. The change in the port connection status indicates that a sink device has been connected or disconnected from a port. The master controller is in a RUNNING state following a completion of power distribution for a previously determined change in port connection status. While monitoring for the change, the master controller may determine whether a communication fault or a communication failure is detected (block 204). A heartbeat message can be transmitted by the master controller to all slave controllers at predetermined regular intervals of time, tHeartBeat. If a slave controller does not receive a heartbeat message in a duration of time, tCommunicationFailure, it determines that there is a communication failure with the master controller. In some embodiments, the communication failure is caused by a failure of a serial communication interface between the master controller and the slave controller. In another embodiment, the communication failure is caused by a failure of the master controller or the slave controller. If a slave controller does receive the heartbeat message in the duration of time tCommunicationFailure, it transmits a heartbeat acknowledgement to the master controller. If the master controller does not receive a heartbeat acknowledgement from the slave controller for more than the duration of time tCommunicationFailure, it determines that there is a communication failure with the slave controller. In some embodiments, if a communication failure is detected, the master controller sets the PB of the master port to a fair share value, SP/N, equal to a total system power divided among a total number of ports, if the PB of the master port was previously greater than the fair share value and the slave controller sets the PB of the slave port to the fair share value, SP/N if the PB of the slave port was previously greater than the fair share value (block 206). In another embodiment, if a communication failure is detected, the master controller sets the PB of the master port to a value that is less than the fair share value if the PB of the master port was previously greater than the fair share value, and the slave controller sets the PB of the slave port to a value that is less than the fair share value if the PB of the slave port was previously greater than the fair share value.

The master controller can assess a port connection status (block 208). When the master controller assesses the port connection status, the master controller is in a DETERMINE_PORT_CONNECT_STATUS state. When the master controller is in the DETERMINE_PORT_CONNECT_STATUS state, the master controller determines or assesses the port connection status of all ports, and power allocation is subsequently determined based on the port connection status of all ports. Any change of port status will trigger the master controller to change its state to DETERMINE_PORT_CONNECT_STATUS. In some embodiments, a change of port status is caused when one or more sink devices are connected to or disconnected from any of the power sharing ports, leading to the port connection status being attached or detached, respectively. In another embodiment, a change of port status is caused when one or more sink devices have a faulty connection to the port, at which point the master controller performs a debounce method. The master controller may determine the port connection status as one of three possibilities: that all ports are disconnected, that one port is attached, or that more than one ports are attached. Once the master controller has determined the port connection status, the master controller enters a DISTRIBUTE_LOAD state. The DISTRIBUTE_LOAD state is a first level of power distribution (e.g., port budget (PB) distribution). PB is an amount of power that the master controller allocates to a port, corresponding to a maximum amount of power that the port is allowed to provide to a connected sink device. In some cases, a sink device may request an amount of power (a requested power or a required power) that is lower than the port budget or indicate a higher power requirement (e.g., in the cases of a capability mismatch), and the master controller reconfigures the PB allocated to each port.

In a first case, the master controller determines a port connection status in which all ports are disconnected. The master controller can enter the DISTRIBUTE_LOAD state and assigns ALL PORTS to the variable X (block 210). ALL PORTS refers to the total number of ports, so X=N. The master controller then checks if the state of any of the ports has changed (block 212) in order for the multiport PD system to have no ports attached. If there is no change to the status of any port, then this can indicate that the multiport PD system was initialized with no attached ports and a PB of each port is equal to PB of each other port. The master controller can allocate a power equal to a portion of the total system power to each of the X ports (block 214). The fraction is equal to the total system power divided by the number of ports, or SP/N. In other embodiments, the portion can be equal to a fraction of the total system power, and each portion can be a different fraction of the total system power, that when summed equals the total system power. In other words, the total system power is allocated without leaving any of the total system power unallocated in some cases. In other cases, the total system power is substantially allocated. The master controller, to allocate a power to each of the ports, may send a signal to a slave controller corresponding to each of the ports, and which may cause the slave controller to update a PB of its corresponding port. The master controller may further update the PB of its own corresponding port. In order to ensure that the PB of each of the ports has been successfully updated, the master controller exits the DISTRIBUTE_LOAD state and enters a WAIT_FOR_SLAVE_COMPLETE or a WAIT_FOR_MASTER_COMPLETE state. In the WAIT_FOR_SLAVE_COMPLETE state the master controller has triggered a slave PB change and must wait for the slave controller to update the PB of its corresponding slave port. The slave controller may send a notification to the master controller when the operation is complete to notify the master controller of the completion. In the WAIT_FOR_MASTER_COMPLETE state, the master controller has triggered a PB change of its own master port and must wait for the operation to complete. The master controller performs a power processing complete check to check that the PB of all ports has been successfully updated (block 216). Once the PB of all ports has been successfully updated, and the master controller has received notification from the slave controllers, the master controller exits the WAIT_FOR_SLAVE_COMPLETE and the WAIT_ FOR_MASTER_COMPLETE states and reenters the RUNNING state. The master controller can monitor the status of all ports to determine if there is a change (e.g., a communication failure, a port being attached, and the like) (block 218). The master controller may then repeat the process.

Returning to block 212, when the master controller is in the DISTRIBUTE_LOAD state, if the master controller instead determines that a state of one or more ports has changed, then this indicates that there was a sink device attached to one of the ports and that the sink device has been disconnected so that the multiport PD system no longer has any attached sink device. As further detailed below in the second case, when one sink device is attached, the port to which it was attached is allocated an amount of power PB, while the remaining ports are allocated a portion of the total remaining power, equal to (SP−PB)/(N−1), which is less than PB. In other embodiments, the portion can be equal to a fraction of the total remaining system power, and each portion can be a different fraction of the total system power, that when summed equals the total remaining system power. The master controller can allocate a first fraction of a total system power, the first fraction being SP/N, to each of the one or more ports in a descending order of power requirements (e.g., from high PB to low PB) (block 220). This is done so that the total power allocated to all ports never exceeds the total system power SP. The master controller then exits the DISTRIBUTE_LOAD state and enters the WAIT_FOR_SLAVE_COMPLETE and WAIT_FOR_MASTER_COMPLETE states. The master controller can then perform a power processing complete check (similar to the power processing complete check of block 216) (block 222). Once the master controller determines that power processing is complete, and that the PB of the one or more ports have been successfully updated, the master controller exits the WAIT_FOR_SLAVE_COMPLETE and WAIT_FOR_MASTER_COMPLETE states and reenters the DISTRIBUTE_LOAD state. The master controller assigns REMAINING PORTS, corresponding to the ports for which the PBs have not yet been updated, to the variable X (block 224). The master controller then performs the steps of blocks 214, 216, and 218 as described above.

In some embodiments, the master controller does not need to allocate the first fraction SP/N of the total system power to each of the one or more ports in a descending order of power requirements. For example, the master controller can allocate the first fraction to each of the one or more ports in a random order, a sequential order, or other order.

In a second case, in which the master controller determines that there is one attached port (following block 208) while it is in the DETERMINE_PORT_CONNECT_STATUS state the master controller enters the DISTRIBUTE_LOAD state and allocates a second fraction of the total system power, the second fraction being (SP−PB)/(N−1), to each of the attached ports from high PB to low PB (block 226). The master controller then changes its state to WAIT_FOR_SLAVE_COMPLETE and the WAIT_FOR_MASTER_COMPLETE and can perform a power processing complete check to ensure that the PB of each of the unattached ports has been successfully updated (block 228). Once the master controller determines that the PB of each of the unattached ports has been successfully updated, the master controller changes its state to DISTRIBUTE_LOAD and allocates a power of PB to the attached port, which allows the attached port to have the maximum power supported by a port (block 230). The master controller can then perform a power processing complete check to ensure that the PB of the attached port has been successfully updated (block 216). Once the master controller has determined that the PB of the attached port has been successfully updated, the master port changes its state to RUNNING and monitors all port statuses to determine if there is a change (block 218).

In a third case, in which the master controller determines that there is more than one attached port (following block 208) during the DETERMINE_PORT_CONNECT_STATUS state, the master controller enters the DISTRIBUTE_LOAD state. The master controller can then allocate a fair share power of SP/N to each port in the order from high PB to low PB to ensure that the total allocated power never exceeds the total system power SP (block 232). The master controller changes its state to WAIT_FOR_SLAVE_COMPLETE and/or WAIT_FOR_MASTER_COMPLETE and performs a power processing complete check to ensure that the PB of the ports has been successfully updated (block 234). The master controller then changes its state to a REDISTRIBUTE_UNUSED_LOAD and performs a power redistribution method at point B 236.

In each of the second case and the third case, before the master controller changes its state from DETERMINE_PORT_CONNECT_STATUS (block 208) to DISTRIBUTE_LOAD (blocks 226 and 232) the master controller waits for a threshold time, tDebounce, before beginning to reallocate power. tDebounce is a timing parameter that defines a duration during which a port status change should remain consistent to be considered valid when at least one port is already connected. When at least one port is already attached, any subsequent port status change can be considered valid if it is consistent for the threshold time tDebounce. Power sharing specific PB updates can happen when the status change is considered valid. This allows the system to be resilient to bad sink device connection or disconnection to a port and prevents unnecessary power reallocations to already connected ports under such a scenario. The master controller may apply the threshold time, tDebounce, to check that a change of status of a port is valid before performing any power allocation or reallocation, as ports may be attached or detached at any time during operation.

The method starting from point B 236 may be implemented when the master controller determines that there is more than one attached port and power should be redistributed among the attached ports. While performing the method of dynamic and intelligent power sharing, the master controller enters various states of operation.

At block 238, the master controller changes its state to REDISTRIBUTE_UNUSED_LOAD. When a sink device is connected or attached to a port, a port connection status of the port is attached, and the sink device requests an amount of power, RP, from the port. The requested amount of power, or requested power, can be configured to be a selected power data object (PDO) voltage multiplied by a PDO current or a selected PDO voltage multiplied by a requested data object (RDO) current. If there is no sink device connected to a port (e.g., if the port is detached), the requested power of the corresponding port is zero. The master controller can define an initial number of DOWN devices as zero and an initial number of UP devices as zero (block 238). An UP port is a port whose requested power is greater than or equal to the threshold value. In some embodiments, the threshold value is SP/N. In another embodiment, the threshold value can be chosen to be (SP/N)−1 in order to avoid any decimal conversion issues. The master controller compares the RP of each port against the threshold value (block 240) and counts the number of UP ports and the number of DOWN ports (blocks 242-246). In the REDISTRIBUTE_UNUSED_LOAD state, the master controller attempts to redistribute residual or unused power load of the DOWN ports to the UP ports if there is any. After the master controller counts the number of UP ports and the number of DOWN ports, the master controller can check if the number of UP ports is either zero or the total number of ports N (block 248). If there are no ports that are requested to deliver a power greater than or equal to the threshold value, the master controller is not required to redistribute the power among the ports, and each port maintains a fair share power of SP/N. If all of the ports are requested to deliver a power greater than or equal to the threshold value, there will be no unused power load for the master controller to redistribute. If the number of UP ports is equal to zero or N, the master controller does not need to or cannot redistribute power, and changes its state to RUNNING, and continues to monitor for port status changes (block 250).

If the number of UP ports is not equal to 0 or N, the master controller remains in the REDISTRIBUTE_UNUSED_LOAD state and proceeds to decrease power allocated to the DOWN ports and subsequently increase power allocated to the UP ports. The master controller calculates a first value SP/N−DOWN(RP) for each DOWN port and sums each of the first values to obtain PDOWN(TOTAL) (block 252). The master controller calculates a second value PUP(TOTAL)=(PB−SP/N)*UP(COUNT) for all UP ports (block 254). The master controller calculates a third value which is a minimum of the first value and the second value: REDISTRIBUTE_POWER=MIN(PDOWN(TOTAL), PUP(TOTAL)) (block 256). The master controller then decreases each DOWN port PB by allocating a power of MAX((SP−REDISTRIBUTE_POWER)/N, RP) to each DOWN port (block 258), where RP is the requested power of the respective DOWN port. The master controller then enters a WAIT_FOR_SLAVE_COMPLETE or WAIT_FOR_MASTER_COMPLETE state to ensure that the PB values for all DOWN ports have been successfully updated (block 260).

Once the PB values for all DOWN ports have been successfully updated, the master controller returns to the REDISTRIBUTE_UNUSED_LOAD state. The master controller increases each UP port PB by allocating a power of (SP+REDISTRIBUTE_POWER)/N to each UP port (block 262). The master controller then enters a WAIT_FOR_SLAVE_COMPLETE or WAIT_FOR_MASTER_COMPLETE state to ensure that the PB values for all UP ports have been successfully updated (block 264). The master controller then changes its state to RUNNING, and monitors for port status changes (block 266).

Figure 3:
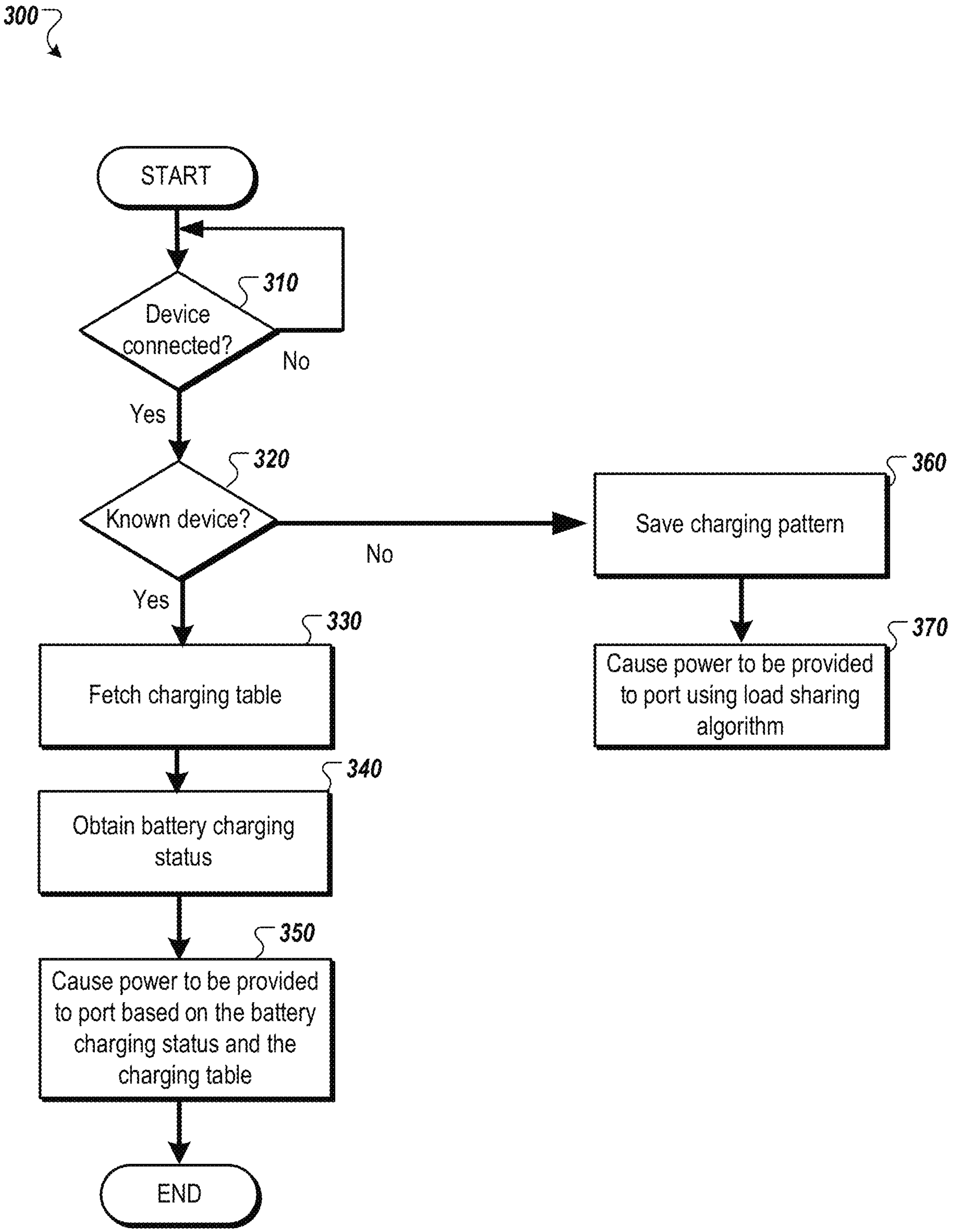
FIG. 3 illustrates a flow diagram of a method of determining charging characteristics for adaptive power sharing, according to some embodiments.

FIG. 3 illustrates a flow diagram of a method 300 of determining charging characteristics for adaptive power sharing, according some embodiments. The method 300 is executed on a LS master controller, in some embodiments. The method 300 may be performed by processing logic that comprises hardware (e.g., circuitry, dedicated logic, programmable logic, microcode, etc.), software, firmware, or a combination thereof. In some embodiments, method 300 may be performed by any of the processing devices described herein. In some embodiments, method 300 is performed by processing logic instantiated in a master controller, such as LS master controller 112 of FIG. 1. In some embodiments, the master controller executes a firmware-based method that performs the method 300. In some embodiments, the master controller has embedded code or logic and is configured to execute instructions to perform the illustrated operations.

At operation 310, processing logic determines whether a device is connected. If not, the process reverts back to operation 310. At operation 320, a device is determined to be connected, then processing logic determines whether the device is a known device. A known device refers to a device that has been previously determined to have been connected.

At operation 330, if the device is determined to be a known device, then processing logic fetches a charging table associated with the device. In some embodiments, fetching the charging table includes fetching the charging table from flash corresponding to the device. At operation 340, processing logic obtains a battery charging status from the device. At operation 350, processing logic causes power to be provided to a port based on the battery charging status and the charging table.

At operation 360, if the device is determined to be an unknown device (e.g., a device that is not determined to have been previously connected), then processing logic saves a charging pattern associated with the device. In some embodiments, the charging pattern is saved to flash corresponding to the device. At operation 370, processing logic causes power to be provided to a port using a load sharing algorithm.

Figure 4:
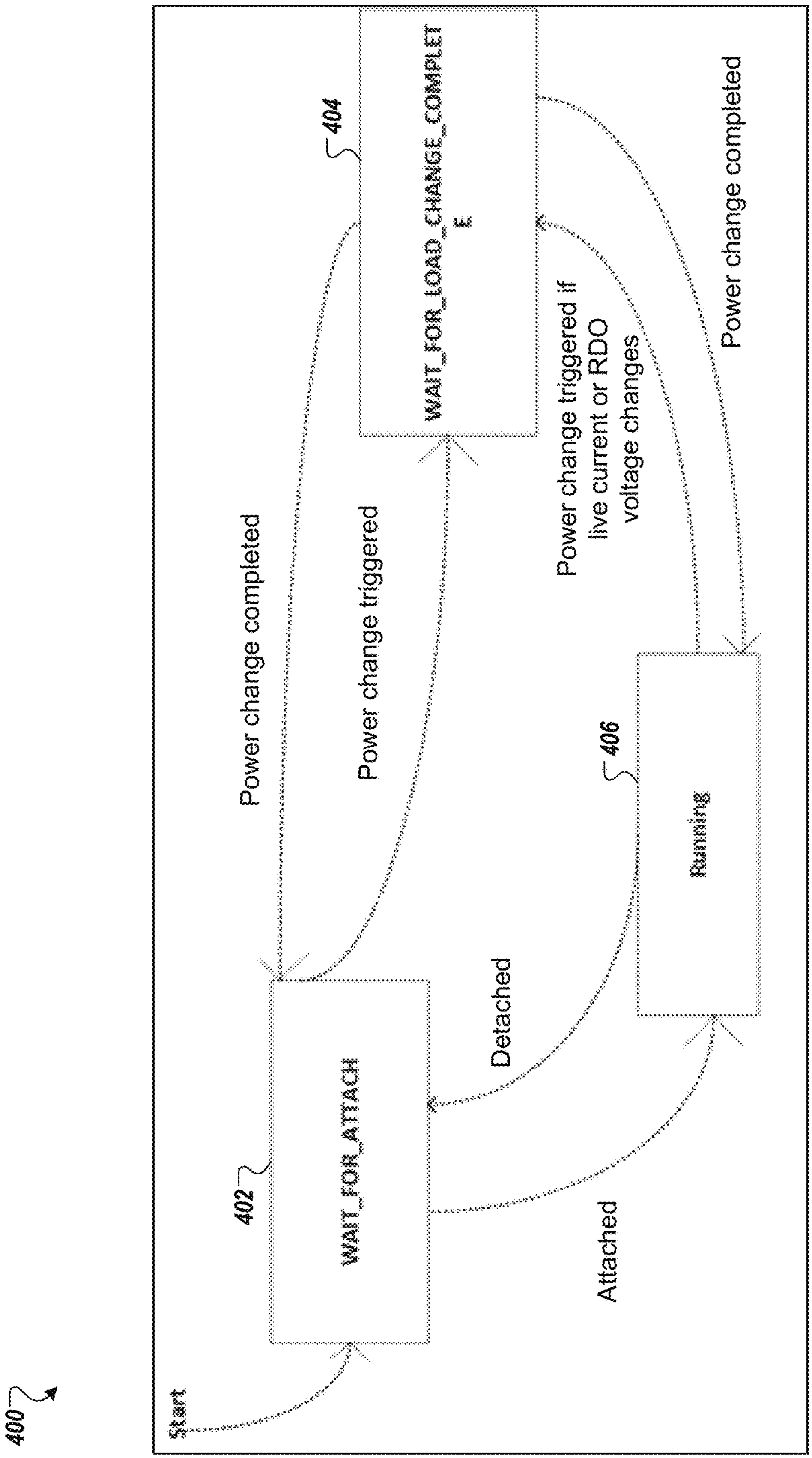
FIG. 4 illustrates a schematic diagram of an example finite state machine (FSM) of a slave controller of a multiport PD system, according to some embodiments.

FIG. 4 is a schematic diagram of an FSM 400 of a slave controller of a multiport PD system, according to some embodiments. FSM 400 can correspond to operations performed by processing logic that comprises hardware (e.g., circuitry, dedicated logic, programmable logic, microcode, etc.), software, firmware, or a combination thereof. FSM 400 may correspond to operations performed by any of the processing devices described herein. In some embodiments, FSM 400 corresponds to operations performed by processing logic of a slave controller such as LS slave controller 114 of FIG. 1. In some embodiments, the slave controller executes a firmware-based method that performs operations associated with the following states. In another embodiment, the slave controller has embedded code or logic and is configured to execute instructions to perform the operations associated with the following states.

The role of the slave controller is to trigger a power change (e.g., PB change) of a slave port associated with the slave controller in response to receiving a command from a master controller, such as LS master controller 112 of FIG. 1, and to inform the master controller about the slave port status. The slave controller informs the master controller about the slave port connection status (e.g., whether or not the slave port is attached to a sink device) and to notify the master controller when the power change of the slave port is successfully completed. The slave controller receives periodic heartbeat messages at predefined regular intervals (tHeartBeat) from the master controller in order to check for communication failures. The slave controller transmits heartbeat acknowledgement messages to the master controller to acknowledge receipt of the heartbeat message. A communication failure can occur if the slave controller has not received a heartbeat message in a threshold amount of time (tCommunicationFailure). In the event of a communication failure with the master controller, the slave controller can perform any needed PB reduction. In some embodiments, at the time of the communication failure, the PB of the slave port is greater than the fair share value, SP/N, and the slave controller performs the necessary PB reduction by updating the PB of the slave port to the fair share value. In another embodiment, at the time of the communication failure, the PB of the slave port is less than or equal to the fair share value, SP/N, and the slave controller performs any needed PB reduction by taking no action.

During operation of the multiport PD system, the slave controller operates in various states. Initially, when the multiport PD system is started, the slave controller is in a WAIT_FOR_ATTACH state (block 402). The slave controller stays in the WAIT_FOR_ATTACH state whenever the slave port is unattached. In the WAIT_FOR_ATTACH state, the slave controller may receive a command from the master controller to trigger a power change of the slave port. The slave controller enters a WAIT_FOR_LOAD_CHANGE_COMPLETE state (block 404), while it updates the power of the slave port and while the power change is in progress. The slave controller exits the WAIT_FOR_LOAD_ CHANGE_COMPLETE state when it sends a notification to the master controller that the power change of the slave port is complete and successful. When the power change is complete, the slave controller returns to the WAIT_FOR_ATTACH state.

If a sink device is connected to the slave port, the slave port becomes attached, and the slave controller enters a RUNNING state (block 406) in which power is provided to the sink device. The slave controller stays in the RUNNING state when it is attached, and when no power change is in progress. While the slave controller is in the RUNNING state, it may receive a command from the master controller to trigger a power change of the slave port if the live current or RDO voltage changes. The slave controller enters the WAIT_FOR_LOAD_CHANGE_COMPLETE state, while it updates the power of the slave port and while the power change is in progress. The slave controller exits the WAIT_FOR_LOAD_CHANGE_COMPLETE state when it sends a notification to the master controller that the power change of the slave port is complete and successful. When the power change is complete, the slave controller returns to the RUNNING state. If the sink device is disconnected from the slave port, the slave port becomes detached, and the slave controller returns to the WAIT_FOR_ATTACH state.

Figure 5:
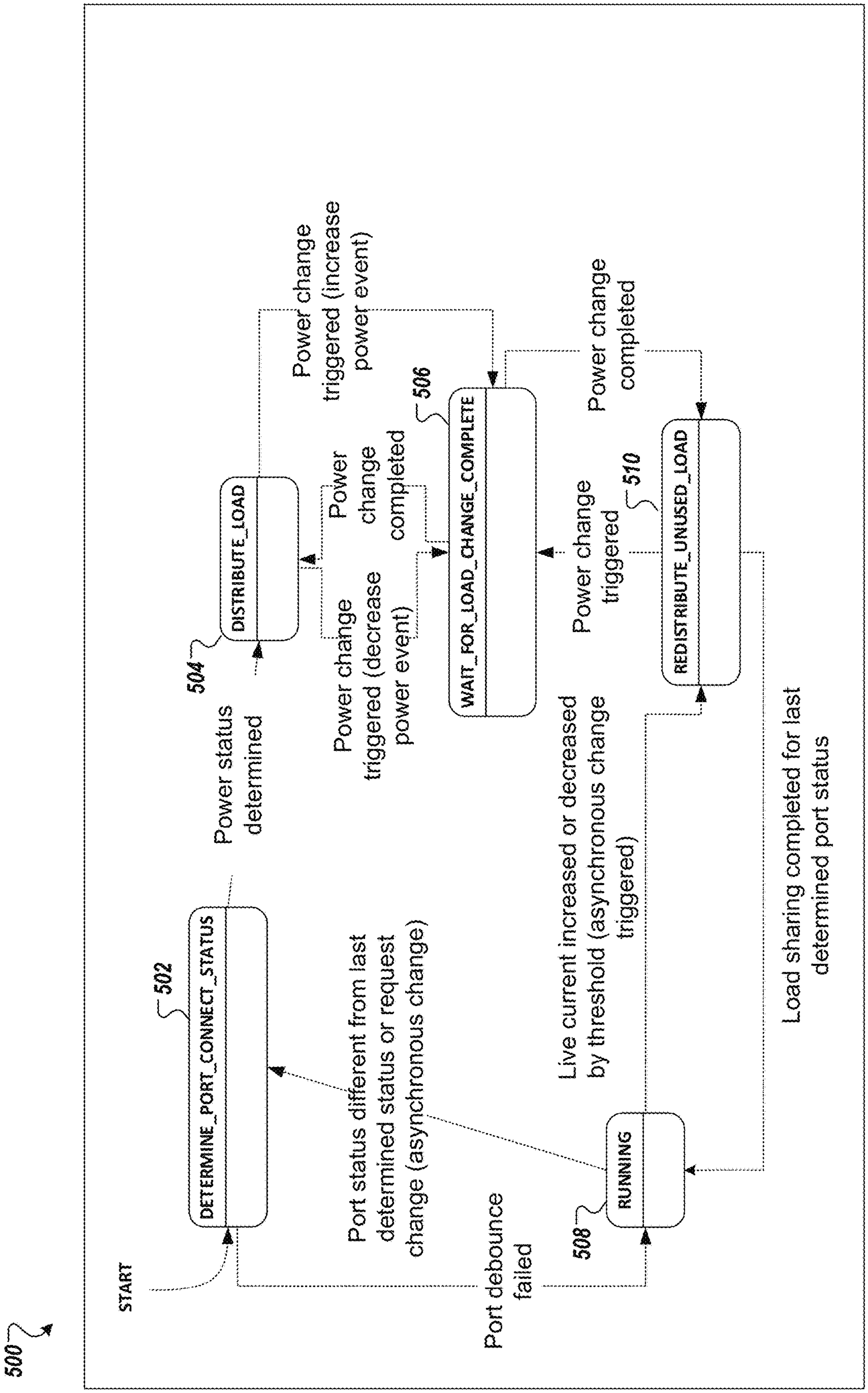
FIG. 5 illustrates a schematic diagrams of an example finite state machine (FSM) of a master controller of a multiport PD system, according to some embodiments.

FIG. 5 is a schematic diagram of an FSM 500 of a master controller of a multiport PD system according to some embodiments. FSM 500 may correspond to operations performed by processing logic that comprises hardware (e.g., circuitry, dedicated logic, programmable logic, microcode, etc.), software, firmware, or a combination thereof. FSM 500B may correspond to operations performed by any of the processing devices described herein. In some embodiments, FSM 500 corresponds to operations performed by processing logic of a master controller such as LS master controller 112 of FIG. 1. In some embodiments, the master controller executes a firmware-based method that performs the operations associated with the following states. In some embodiments, the master controller has embedded code or logic and is configured to execute instructions to perform the operations associated with the following states. The master controller may be the LS master controller 112 of FIG. 1 and the multiport PD system may be the multiport PD system 100 of FIG. 1.

In accordance with the techniques described herein, in some embodiments the role of the master controller is to keep track of a port connection status of each port (including slave ports and a master port) and to distribute the system power based on the actual/live power consumed by the respective sink devices attached to each port. The master controller corresponds to the master port and the master controller determines a port connection status and the actual power consumption of the master port. The master controller can determine a port connection status and the actual power consumption of the slave ports by receiving a notification from corresponding slave controllers. The master controller sends commands to the slave controllers to update the PBs of the corresponding slave ports, in accordance with the techniques described herein. The master controller receives notifications or indications from the slave controllers when the corresponding PBs have been successfully updated. The master controller may update a PB of the master port when necessary. The master controller can send periodic heartbeat messages at predefined regular intervals to the slave controllers in order to monitor for communication failure.

A communication failure with a slave controller can occur if the master controller has not received a heartbeat acknowledgement from the slave controller in a threshold amount of time (tCommunicationFailure). In the event of a communication failure with the slave controller, the master controller can perform any needed PB reduction. In some embodiments, at the time of the communication failure, the PB of the master port is greater than the fair share value, SP/N, and the master controller performs a PB reduction by updating the PB of the master port to the fair share value. In PB budget of the master port is less than or equal to the fair share value, SP/N, and the master controller performs a PB reduction by taking no action.

In some embodiments, the master controller can determine to reallocate power among the ports when a sink device is connected or disconnected from a port, causing the port to become attached or detached respectively. In some cases, for example, when the sink device is faulty or has an intermittent connection to a port, the port connection status may change rapidly. If the port connection status changes within a threshold debounce time, tDebounce, the master controller regards it as invalid. The threshold debounce time is a timing parameter through which the port connection status change should remain consistent to be considered valid when at least one more port is already attached.

During operation of the multiport PD system, the master controller operates in various states. Initially, when the multiport PD system is started, the master controller is in a DETERMINE_PORT_CONNECT_STATUS state (block 502). In the DETERMINE_PORT_CONNECT_STATUS state, the master controller determines the port connection status of each port, including the master port and the slave port, as described in reference to block 208 of FIG. 2A. The master controller determines how to allocate power among the ports based on the port connection status, as described in reference to FIGS. 2A-2B.

When the port connection status of each port is known, the master controller enters a DISTRIBUTE_LOAD state (block 504). The DISTRIBUTE_LOAD state is a first level of PB distribution. If there are no attached ports, the master controller allocates a fair share power of SP/N to each port. If there is one attached port, the master controller allocates a PB of (SP−PB)/(N−1) to each unattached port and allocates a power of PB to the one attached port.

In the DISTRIBUTE_LOAD state, the master controller can trigger a power change (e.g., PB change). In some embodiments, the power change is a decrease power event. In some embodiments, the power change is an increase power event. After triggering the power change, the master controller can enter a WAIT_FOR_LOAD_CHANGE_COMPLETE state (block 506). When the power change is completed, the master controller can return to the DISTRIBUTE_LOAD state.

When power allocation (e.g., load sharing) is completed for the last determined port connection status, the master controller can enter a RUNNING state (block 508). The master controller is in the RUNNING state after completing power distribution for the last determined port connection status for each port. Any change of port connection status different from the last determined status or change request (e.g., asynchronous change) can trigger the master controller to enter the DETERMINE_PORT_CONNECTION_STATUS state. Additionally, any port debounce failure can trigger the master controller to enter the DETERMINE_PORT CONNECTION_STATUS state. In some embodiments, the master controller spends the most amount of time in the RUNNING state (in comparison to the other states).

If there are multiple attached ports, the master controller can increase or decrease the live current by a live current threshold ("threshold") and enter the REDISTRIBUTE_UNUSED_LOAD state (block 510). In the REDISTRIBUTE_UNUSED_LOAD state, the master controller attempts to reallocate power from ports that are unattached or ports that are attached with sink devices with low power requests (DOWN ports) to ports that are attached with sink devices with high power requests (UP ports). The increase or decrease to the live current can cause the master controller to enter the WAIT_FOR_LOAD_CHANGE_COMPLETE state. When the power changes of all ports are completed, the master controller returns to the REDISTRIBUTE_UNUSED_LOAD state. When power reallocation (e.g., load sharing) is completed for the last determined port connection status, the master controller enters the RUNNING state. The master controller can enter the RUNNING state after completing power distribution for the last determined port connection status for each port. Further details regarding the operations described with respect to FSMs 400 and 500 will be described below with reference to FIG. 7B.

Figure 6:
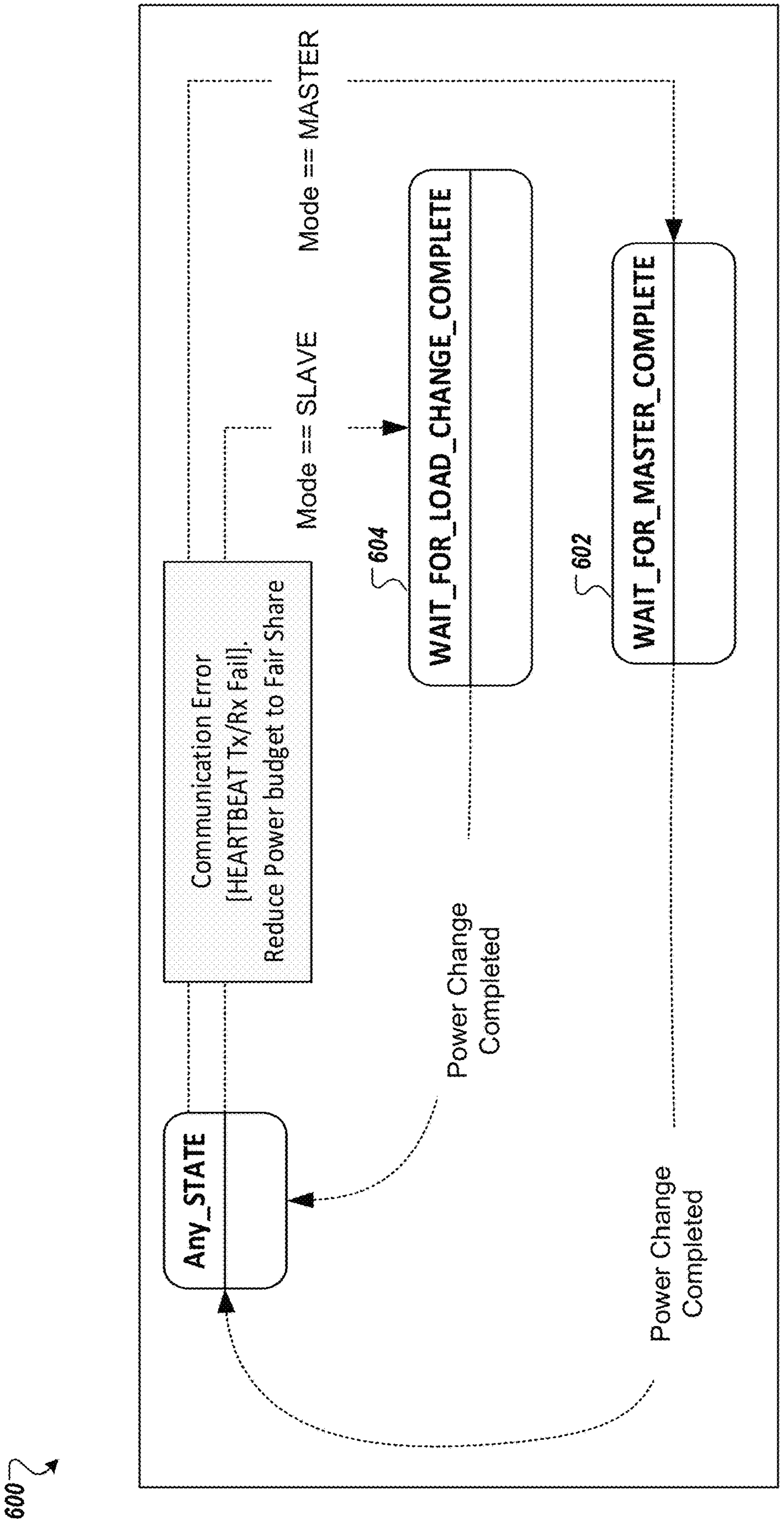
FIG. 6 illustrates a schematic diagram of an example finite state machine (FSM) of master controller and slave controller communication fault handling, according to some embodiments.

FIG. 6 is a schematic diagram of an FSM 600 of master controller and slave controller communication fault handling, according to some embodiments. FSM 600 can correspond to operations performed by processing logic that comprises hardware (e.g., circuitry, dedicated logic, programmable logic, microcode, etc.), software, firmware, or a combination thereof. FSM 600 may correspond to operations performed by any of the processing devices described herein. In some embodiments, FSM 600 is performed by processing logic of a controller such as LS master controller 112 of FIG. 1. In some embodiments, FSM 600 is performed by processing logic of a controller such as LS slave controller 114 of FIG. 1. In some embodiments, the controller executes a firmware-based method that performs operations associated with the following states. In another embodiment, the controller has embedded code or logic and is configured to execute instructions to perform the operations associated with the following states.

A communication failure can happen at any time, and during any state of a master controller and slave controllers. The master controller sends periodic heartbeat messages at predefined regular intervals (tHeartBeat) to the slave controllers in order to monitor for communication failures. The slave controller receives the heartbeat messages and can transmit heartbeat acknowledgement messages to the master controller to acknowledge receipt of the heartbeat message. A communication failure between the slave controller and the master controller can occur if the slave controller has not received a heartbeat message from the master controller and the master controller has not received a heartbeat acknowledgement from the slave controller in a threshold amount of time (tCommunicationFailure). In the event of a communication failure between the master controller and the slave controller, both the master controller and the slave controller can perform any needed PB reductions.

If, at the time of the communication failure, the PB of the master port is greater than the fair share value, SP/N, the master controller can perform a PB reduction by updating the PB of the master port to the fair share value. If, at the time of the communication failure, the PB of the master port is less than or equal to the fair share value, SP/N, the master controller performs a PB reduction by taking no action. The master controller enters a WAIT_FOR_MASTER_COMPLETE state (block 602) while the PB reduction occurs, and returns to its previous state when the PB reduction is completed.

If, at the time of the communication failure, the PB of the slave port is greater than the fair share value, SP/N, then the slave controller can perform a PB reduction by updating the PB of the slave port to the fair share value. If, at the time of the communication failure, the PB of the slave port is less than or equal to the fair share value, SP/N, then the slave controller can perform a PB reduction by taking no action. The slave controller enters a WAIT_FOR_LOAD- _CHANGE_COMPLETE state (block 604) while the PB reduction occurs, and returns to its previous state when the PB reduction is completed.

Figure 7A:
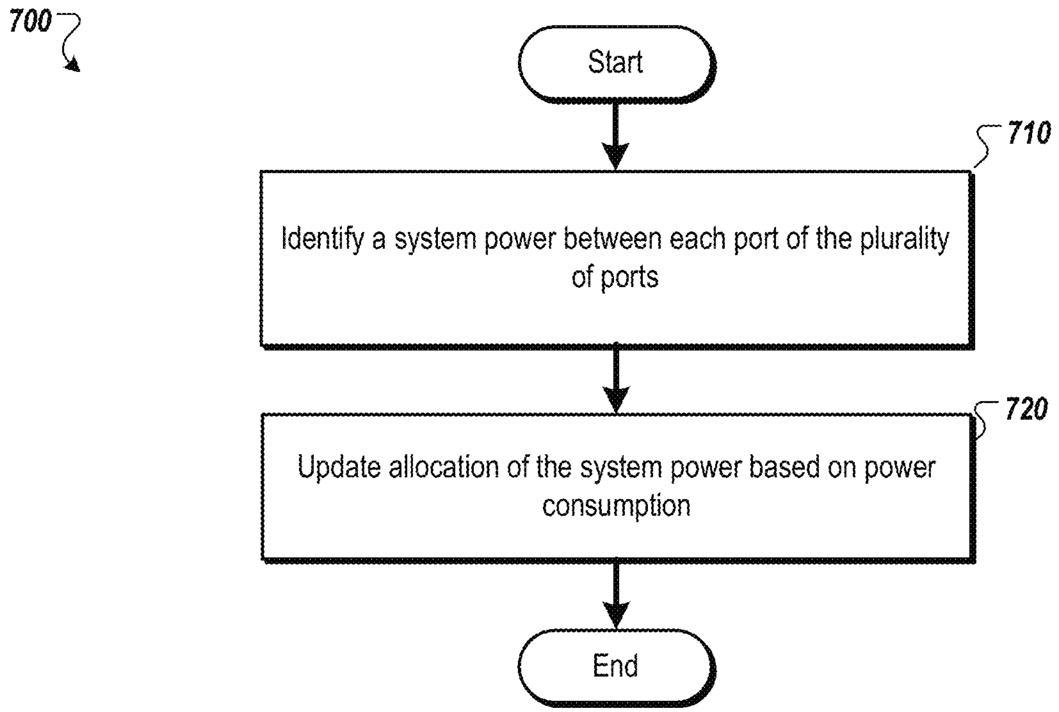
FIGS. 7A-7C are flow diagrams of example methods of implementing intelligent power sharing among ports in a multiport PD system, according to some embodiments.

FIG. 7A is a flow diagram of a method 700 of implementing intelligent power sharing among ports in a multiport PD system, according to some embodiments. The method 700A may be performed by processing logic that comprises hardware (e.g., circuitry, dedicated logic, programmable logic, microcode, etc.), software, firmware, or a combination thereof. In some embodiments, the method 700A may is performed by any of the processing devices described herein. In some embodiments, the method 700 is performed by processing logic of a controller such as LS master controller 112 of FIG. 1. In some embodiments, the method 700A is performed by processing logic of a controller such as LS slave controller 114 of FIG. 1. In some embodiments, the controller executes a firmware-based method that performs the following operations. In some embodiments, the controller has embedded code or logic and is configured to execute instructions to perform the following operations. In some embodiments, the operations of method 700A can be distributed between the master controller and the slave controller.

At operation 710, processing logic identifies a system power between each port of a plurality of ports in a multiport PD system. In some embodiments, identifying the system power includes dynamically allocating the system power. An example implementation of dynamically allocating the system power is described above with reference to FIGS. 1-6 and will be described in further detail below with reference to FIG. 7B.

At operation 720, processing logic updates allocation of the system power based on power consumption. An example implementation of updating allocation of the system power based on power consumption is described above with reference to FIGS. 1-6 and will be described in further detail below with reference to FIG. 7C.

Figure 7B:
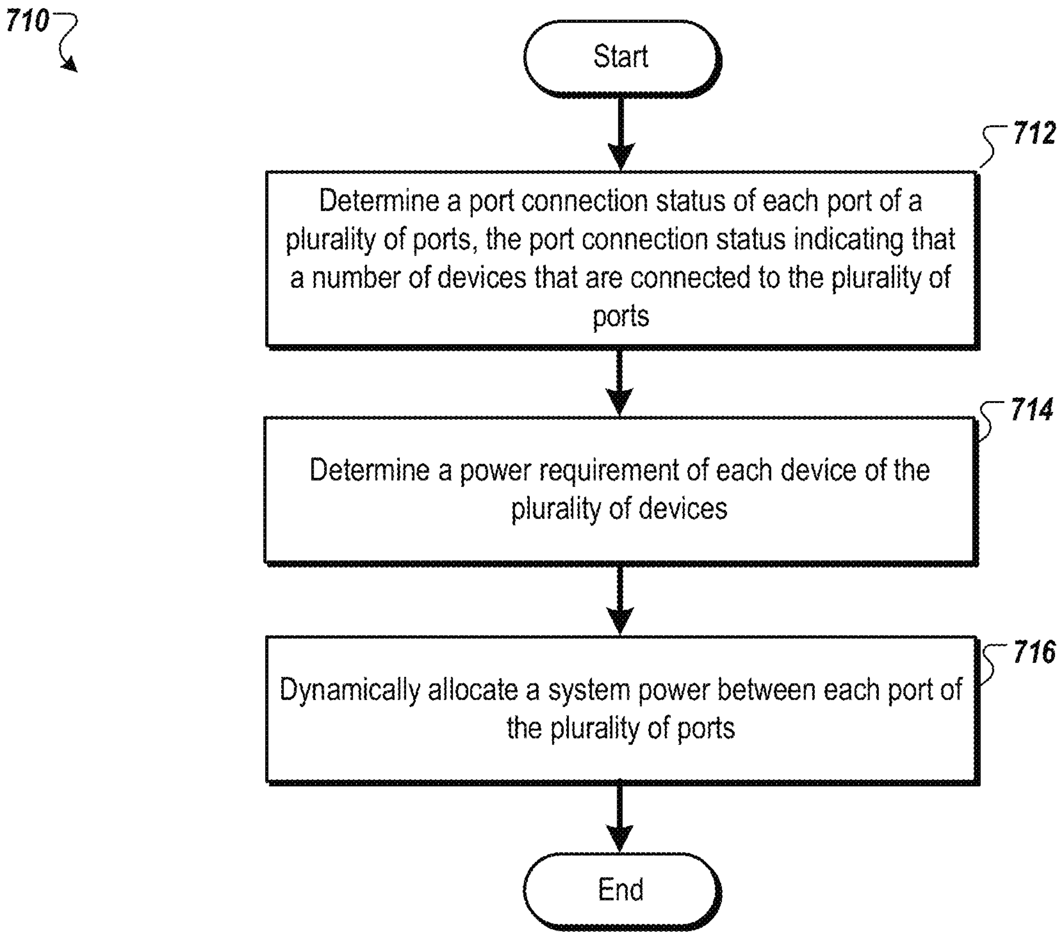

FIG. 7B is a flow diagram of a method 710 of dynamically allocating a system power between each port of a plurality of ports in a multiport PD system, according to some embodiments. The method 710 may be performed by processing logic that comprises hardware (e.g., circuitry, dedicated logic, programmable logic, microcode, etc.), software, firmware, or a combination thereof. In some embodiments, the method 710 may is performed by any of the processing devices described herein. In some embodiments, the method 710 is performed by processing logic of a controller such as LS master controller 112 of FIG. 1. In some embodiments, the method 710 is performed by processing logic of a controller such as LS slave controller 114 of FIG. 1. In some embodiments, the controller executes a firmware-based method that performs the following operations. In some embodiments, the controller has embedded code or logic and is configured to execute instructions to perform the following operations. In some embodiments, the operations of method 710 can be distributed between the master controller and the slave controller.

At operation 712, processing logic determines a port connection status of each port of a plurality of ports, with the port connection status indicating a number of devices that are connected to the plurality of ports. The plurality of ports can be included within a multiport PD system. In some embodiments, each port of the plurality of ports is a USB-C/PD port.

At operation 714, processing logic determines a power requirement of each device of the plurality of devices.

At operation 716, processing logic dynamically allocates a system power between each port of the plurality of ports. The system power can be allocated independent of a connection sequence of the plurality of devices.

In some embodiments, to dynamically allocate the system power, processing logic determines an order for the devices. Processing logic allocates a fraction of the system power to each port of the plurality of ports in the order. The fraction is equal to the system power divided by a number of the USB-C/PD ports. After allocating the fraction to each port of the plurality of ports, processing logic can determine an amount of unused power of the system power. Processing logic can redistribute the amount of unused power to at least one port of the plurality of ports. In some embodiments, processing logic redistributes the amount of unused power among each port of the plurality of ports that is connected to a respective device with a power requirement (or requested power or live power consumption) that is larger than the fraction.

In some embodiments, the order is a descending order of the power requirements for the devices. In other embodiments, the order can be a random order of the devices, an order in which the devices were connected, or another order.

In some embodiments, to determine the power requirement of each of the devices, processing logic determines a first power requirement of a first device connected to a first port of the plurality of ports and a second power requirement of a second device connected to a second port of the plurality of ports. In some embodiments, processing logic determines that the second power requirement is less than the first power requirement. Processing logic can allocate half of the system power to the first port and half of the system power to the second port. Processing logic can determine a residual amount of power as a difference between half of the system power and the second power requirement and allocates the residual amount of power to the first port in addition to the half of the system power already allocated to the first port. In some embodiments, processing logic allocates a fraction of the residual amount of power to the first port and the second port.

In some embodiments, processing logic determines a change in the port connection status of one or more ports of the plurality of ports. In some embodiments, the change in the port connection status indicates that no devices are connected to any ports of the plurality of ports. In some embodiments, processing logic is initialized with no devices connected to any ports of the plurality of ports, and processing logic allocates a portion of the system power to each port of the plurality of ports responsive to the change in the port connection status. In some embodiments, the portion of the system power is equal to the system power divided by a number of ports of the plurality of ports. Alternatively, a portion of the system power can be equal to a fraction of the total system power, and each portion of the system power can be a different fraction of the total system power, that when summed equals the total system power. In some embodiments, the change in the port connection status indicates that a device that was connected to a port has been disconnected, and there are no devices connected to any ports of the plurality of ports. Processing logic can allocate the portion of the system power to each port of the plurality of ports in order of ports with a highest PB to ports with a lowest PB, responsive to the change in the port connection status.

In some embodiments, the change in the port connection status indicates that only a first device is connected to a first port of the plurality of ports. Processing logic allocates an amount of the system power to the first port. In some embodiments, the amount is equal to a first power requirement of the first device. In another embodiment, the amount may be greater than the first power requirement of the first device. In another embodiment, the amount may be less than the first power requirement of the first device, but greater than a fair share fraction, the fair share fraction being equal to the system power divided by the number of ports of the plurality of ports. Processing logic can determine a residual power that is equal to the difference between the system power and the amount of power (that is allocated to the first port). Processing logic can allocate a fraction of residual power, equal to the residual power divided by a number of unconnected ports, to each of the unconnected ports, responsive to the change in the port connection status. Alternatively, processing logic can allocate a portion of the residual power. The portion can be equal to a fraction of the residual power, and each portion can be a different fraction of the total system power, that when summed equals the residual power. Processing logic allocates the fraction of the residual power to each port of the plurality of ports in order of ports with a highest PB to ports with a lowest PB, responsive to the change in the port connection status.

In some embodiments, the change in the port connection status indicates that a subset of devices of the plurality of devices is connected to a subset of ports of the plurality of ports. The subset of devices can include more than one device. Processing logic can determine an order for the subset of devices. Processing logic can allocate a fraction of the system power, equal to the system power divided by a number of the ports of the subset of ports, to each port of the subset of ports in the order. Alternatively, processing logic can allocate a portion of the system power. The portion can be equal to a fraction of the system power, and each portion can be a different fraction of the system power, that when summed equals the residual power. Processing logic determines an amount of unused power of the system power after allocating the fraction to each port of the subset of ports. Processing logic can redistribute the amount of unused power to at least one port of the subset of ports. In some embodiments, the order is a descending order of the power requirements for the subset of devices. In some embodiments, the order can be a random order of the subset of devices, an order in which the subset of devices were connected, or another order.

In some embodiments, processing logic determines whether the change in the port connection status is valid. Processing logic can determine whether the change in the port connection status remains consistent through a specified duration of time. If the change in the port connection status does not remain consistent during the specified duration of time, processing logic can ignore the change in the port connection status. If the port connection status remains consistent during the specified duration of the time, processing logic can reallocate the system power between each of the USB-C/PD ports.

In some embodiments, processing logic detects a communication fault between a first controller and a second controller. In some embodiments, processing logic is processing logic of the first controller. In some embodiments, processing logic is processing logic of the second controller. Processing logic can perform a PB reduction in response to a detection of the communication fault. Processing logic performs the PB reduction by allocating a fraction of the system power to a subset of ports of the plurality of ports. The fraction can be equal to the system power divided by a number of the ports of the plurality of ports or the number of ports of the subset of ports. In some embodiments, process logic allocates the fraction to each port of the plurality of ports. In some embodiments, processing logic allocates the fraction to the first controller and the second controller. In some embodiments, processing logic allocates the fraction to the first controller if the first controller previously had a power allocation that was greater than the fraction, and processing logic allocates the fraction to the second controller if the second controller previously had a power allocation that was greater than the fraction.

In some embodiments, processing logic determines a load sharing role of a controller coupled to a first port of the plurality of ports. The load sharing roll can be either master or slave. In some embodiments, processing logic determines the load sharing role of the controller as master. Processing logic can poll for one or more slaves over a communication interface and initiates a master finite state machine. Each of the slaves can be an additional controller coupled to a respective port of the plurality of ports. In some embodiments, processing logic determines the load sharing role of the controller as slave. Processing logic can register the controller with the master over the communication interface to receive master commands. The master can be a second controller coupled to a second port of the plurality of ports.

In some embodiments, when the load sharing role of the controller is slave, processing logic determines whether a master command has been received from the master. The master command can be at least one of a first command that sets a PB for a first port coupled to the controller, a second command that starts or stops heartbeat signaling between the slave and the master over the communication interface, or a third command that provides a port connection status of the first port to the master. Processing logic can determine whether a communication fault has occurred between the master and the slave over the communication interface. If processing logic determines that a communication fault has occurred between the master and the slave over the communication interface, processing logic can adjust a slave PB for the first port to a fair share allocation if the slave PB is greater than the fair share allocation. If the slave PB is less than the fair share allocation, processing logic may not adjust the slave PB. Processing logic can monitor for a change in the port connection status of the first port, and if processing logic detects a change in the port connection status of the first port, processing logic can report the change to the master over the communication interface.

In some embodiments, when the load sharing role of the controller is master, processing logic determines whether a communication fault has occurred between the master and the slave over the communication interface. If processing logic determines that a communication fault has occurred, processing logic can adjust a master PB for a first port coupled to the controller to a fair share allocation if the master PB is greater than the fair share allocation. If the master PB is less than the fair share allocation, processing logic may not adjust the master PB. In some embodiments, processing logic determines a port connection status of each port of the plurality of ports as indicating that more than one port of the plurality of ports is connected to a number of devices. Processing logic can determine an order of power requirements for the number of devices and can allocate a first fraction (or first portion) of the system power to each port of the plurality of ports in the order. The first fraction can be equal to the system power divided by a number of ports of the plurality of ports. Processing logic can redistribute an amount of unused power of the system power to one or more ports of the plurality of ports after allocating the first fraction to each port of the plurality of ports, where the one or more ports of the plurality of ports are coupled to one or more devices, respectively, having a power requirement greater than the first fraction. The order can be a descending order of the power requirements for the devices. Alternatively, the order can be a random order of the devices, an order in which the devices were connected, or another order.

In some embodiments, processing logic determines the port connection status of each port of the plurality of ports as indicating that only a first port of the is connected to a first device. Processing logic can allocate an amount of the system power to the first port. In some embodiments, the amount is equal to a first power requirement of the first device. In some embodiments, the amount is greater than the first power requirement of the first device. In some embodiments, the amount is less than the first power requirement of the first device, but greater than a fair share fraction equal to the system power divided by a number of ports of the plurality of ports. Processing logic can determine an order of PBs for the number of ports, and can allocate a second fraction (or second portion) of a residual power to a remaining number of ports of the plurality of ports in the order. The residual power can be determined as a difference between the system power and the first power requirement. The second fraction can be equal to the residual power divided by the remaining number of ports. The order can be a descending order of the power requirements for the devices. Alternatively, the order can be a random order of the devices, an order in which the devices were connected, or another order.

In some embodiments, processing logic can determine the port connection status of each port of the plurality of ports as indicating that no devices are connected to any ports of the plurality of ports. Processing logic can determine an order of PBs for the plurality of ports and allocate a first fraction of the system power to each port of the plurality of ports in the order. The first fraction is equal to the system power divided by a number of ports of the plurality of ports. The order can be a descending order of the power requirements for the devices. Alternatively, the order can be a random order of the devices, an order in which the devices were connected, or another order.

Figure 7C:
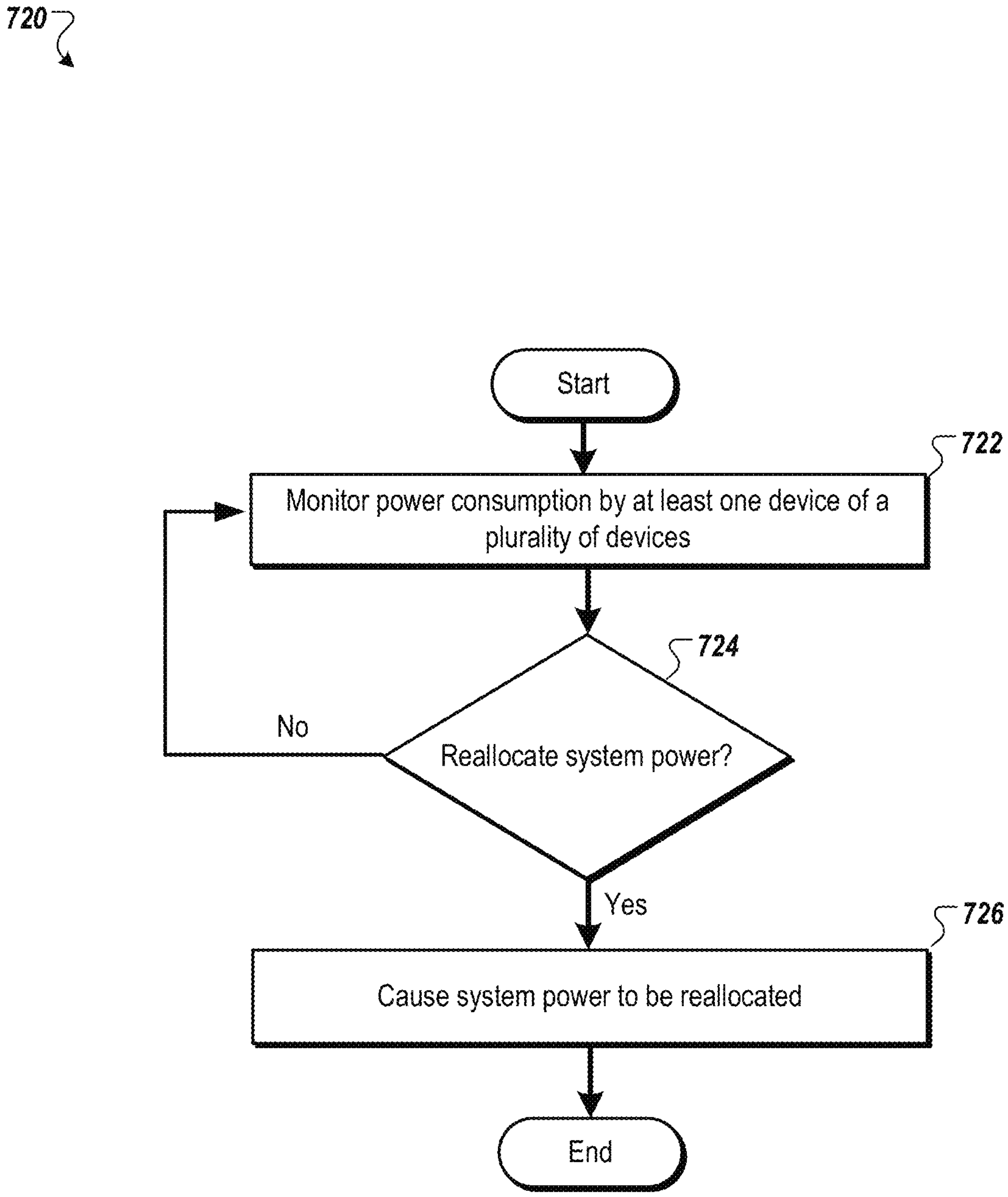

FIG. 7C is a flow diagram of a method 720 of updating allocation of the system power based on power consumption, according to some embodiments. The method 720 may be performed by processing logic that comprises hardware (e.g., circuitry, dedicated logic, programmable logic, microcode, etc.), software, firmware, or a combination thereof. In some embodiments, the method 720 may is performed by any of the processing devices described herein. In some embodiments, the method 720 is performed by processing logic of a controller such as LS master controller 112 of FIG. 1. In some embodiments, the method 720 is performed by processing logic of a controller such as LS slave controller 114 of FIG. 1. In some embodiments, the controller executes a firmware-based method that performs the following operations. In some embodiments, the controller has embedded code or logic and is configured to execute instructions to perform the following operations. In some embodiments, the operations of method 720 can be distributed between the master controller and the slave controller.

At operation 722, processing logic monitors power consumption by at least one device of a plurality of devices. Each device of the plurality of devices can be connected to a port of a plurality of ports of a multiport PD system. In some embodiments, a port is a USB port. For example, a port can be a USB-C/PD port. System power is allocated between each port of a plurality of ports.

At operation 724, processing logic determines, based on the power consumption of the at least one device, whether to reallocate the system power between each port of the plurality of ports. If processing logic determines not to reallocate the system power between each port of the plurality of ports, then processing logic can revert back to operation 722 to continue monitoring power consumption by the at least one device.

At operation 726, if processing logic determines to reallocate the system power between each port of the plurality of ports, then processing logic can cause the system power to be reallocated between each port of the plurality of ports. Reallocating system power can include redistributing system power.

In some embodiments, monitoring power consumption at operation 722 includes causing data indicative of live current consumption to be obtained. More specifically, the data can include at least one current measurement of actual current consumption by the at least one device. A current measurement ($I_{meas}$) can reflect an amount of current (e.g., power) consumed by a device connected to a port of the multiport PD system. For example, a current measurement can correspond to an amount of current or power consumed by a device connected to a port of the multiport PD system that is less than or equal to a PB allocated to the port.

In some embodiments, the at least one current measurement is periodically polled at a live current polling time interval. The live current polling time interval can be configurable per system requirements. In some embodiments, the live current polling time interval ranges between about 50 milliseconds (ms) to about 200 ms. In some embodiments, the at least one current measurement is obtained using an interrupt-based approach.

In some embodiments, determining whether to reallocate the system power at operation 724 includes determining whether the at least one current measurement satisfies a threshold condition. The threshold condition indicates whether $I_{meas}$ has crossed a live current measurement threshold ($I_T$) in either direction (e.g., increased or decreased). In some embodiments, determining whether the at least one current measurement satisfies the threshold condition includes determining whether the at least one current measurement is greater than a previously stored live current measurement ($I_{stored}$) plus the live current measurement threshold ($I_{meas}>I_{stored}+I_T$), or determining whether the at least one current measurement is less than the stored live current measurement minus the live current measurement threshold ($I_{meas}<I_{stored}-I_T$). In some embodiments, $I_T$ is determined based on a power threshold ($P_T$). and RDO voltage ($V_{RDO}$). For example, $I_T$ can be determined as $$\frac{P_T}{V_{RDO}}.$$

In some embodiments, the power threshold is determined based on a power offset ($P_{offset}$). The power offset refers to extra power that can be provided to the port above its actual power consumption. For example, $P_T=P_{offset}-P_{OR}$, where $P_{OR}$ is a power offset reduction. The live current measurement threshold, power threshold, the power offset and/or the power offset reduction can be determined as per the system requirements (e.g., by how much power is needed to trigger power reallocation).

As an illustrative, assume that an RDO voltage is 20 V, a live current measurement (e.g., actual current consumption) is 3 amperes (A), a power threshold is set at 3 W, and a power offset is set at 5 W. The actual power consumption, which is equal to the product of the RDO voltage and the actual current consumption, is 60 W. A power allocation, equal to the sum of the actual power consumed and the power offset, is thus 65 W. A current offset, defined as the power threshold divided by the RDO voltage, is 0.15 A=150 milliamperes (mA). Thus, in this illustrative example, system power can be reallocated if the live current measurement increases or decreases by 150 mA.

In some embodiments, a debounce count is used to enhanced efficiency to reduce or eliminate false triggers. For example, the debounce count can be equal to three. However, any suitable debounce count can be used in accordance with embodiments described herein.

If the at least one current measurement does not satisfy the threshold condition, then processing logic can continue monitoring power consumption. If the at least one current measurement satisfies the threshold condition, then causing the system power to be reallocated at operation 726 can include processing logic causing the system power to be reallocated based on the at least one current measurement. Causing the system power to be reallocated can include determining an amount of power consumed by the at least one device ($P_{consumed}$). In some embodiments, $P_{consumed}$ for a device is determined based on the product of $V_{RDO}$ and $I_{live}$. For example, $P_{consumed}$ for a device can be determined as $P_{consumed}=V_{RDO}\times I_{live}+P_{offset}$. Processing logic can further update $I_{stored}$ with $I_{live}$.

Figure 8A:
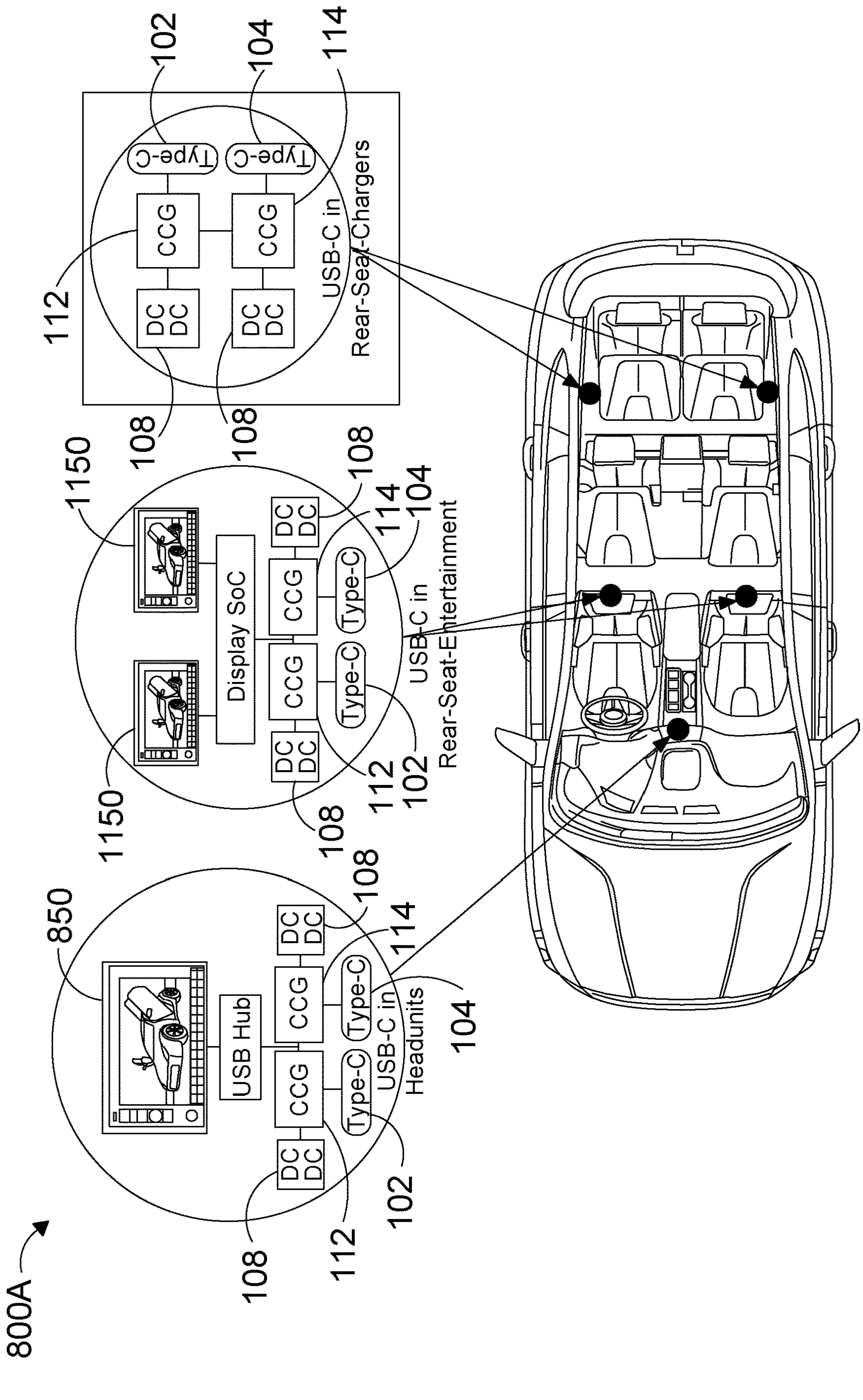
FIG. 8A is a block diagram of various multiport power adapters configured to intelligently distribute power among ports using a firmware-based method, according to some embodiments.

FIG. 8A is a block diagram of various multiport power adapters 800A configured to dynamically and intelligently distribute power among ports using a firmware-based method according to one embodiment. The multiport power adapter 800A may be similar to the multiport PD system 100 of FIG. 1, as noted by similar reference numbers. The multiport power adapter 1100*a* includes one master port 102 and one or more slave ports 104. The master port 102 can be controlled by a master controller 112. The slave ports 104 can be controlled by corresponding slave controllers 114. Power converters 108 convert an input voltage to a different voltage. In the depicted embodiment, power converters 108 are DC-DC power converters. In some embodiments, the multiport power adapter 800A is a multiport USB-C automotive rear-seat charger of an automobile. In another embodiment, multiport power adapter 1100 is part of a rear-seat entertainment system of an automobile. A rear-seat entertainment system can include a display system on chip (SoC), and one or more displays, or other power consuming devices, can be connected to the display SoC. In another embodiment, multiport power adapter 800A is part of a headunit of an automobile. The headunit of the automobile can include a USB hub and a power consuming device can be connected to the USB hub. Power consuming devices can consume power from the same power source as master port 102 and slave ports 104, or power consuming devices can consume power from a different source. In the case where power consuming devices consume power from the same source as master port 102 and slave ports 104, the firmware-based method can dynamically and intelligently allocate power between each of the master port 102, the slave ports 104, and the power consuming devices.

In other embodiments, multiport power adapter 800A can be part of a multiport USB-C charger in a vehicle, car, truck, van, boat, plane, building, house, or the like. In other embodiments, multiport power adapter 800A is a multiport USB-C wall charger, a multiport USB-C power bank, a multiport USB-C power hub, a shared multiport power adapter, or the like. In other embodiments, multiport power adapter 1100*a* may use ports other than USB-C ports, and is a multiport wall charger, a multiport power hub, a multiport power bank, or the like. In other embodiments, the multiport power adapter 800A may use ports other than USB-C, such as wall outlets, Micro-USB ports, or the like. In some embodiments, ports of the multiport USB-C power adapter 800A may not be all the same. For example, the multiport USB-C power adapter may include a number of USB Type-C ports and a number of other ports, such as USB-A, Micro-USB, and USB-A 3.0 ports.

The firmware-based method may be implemented by the multiport power adapter 800A to dynamically share a total system power among connected USB-C/PD charging ports or multiport USB-C/PD controllers by sensing a power requirement of connected sink devices. The multiport power adapter allocates available power between ports, independent of the order that the ports are connected. In some embodiments, the multiport power adapter 800A may include additional power sinks or power consuming devices 850, such as a video display, an audio output, or the like. In some embodiments, the firmware-based method can be applied to any distribution of resources.

Figure 8B:
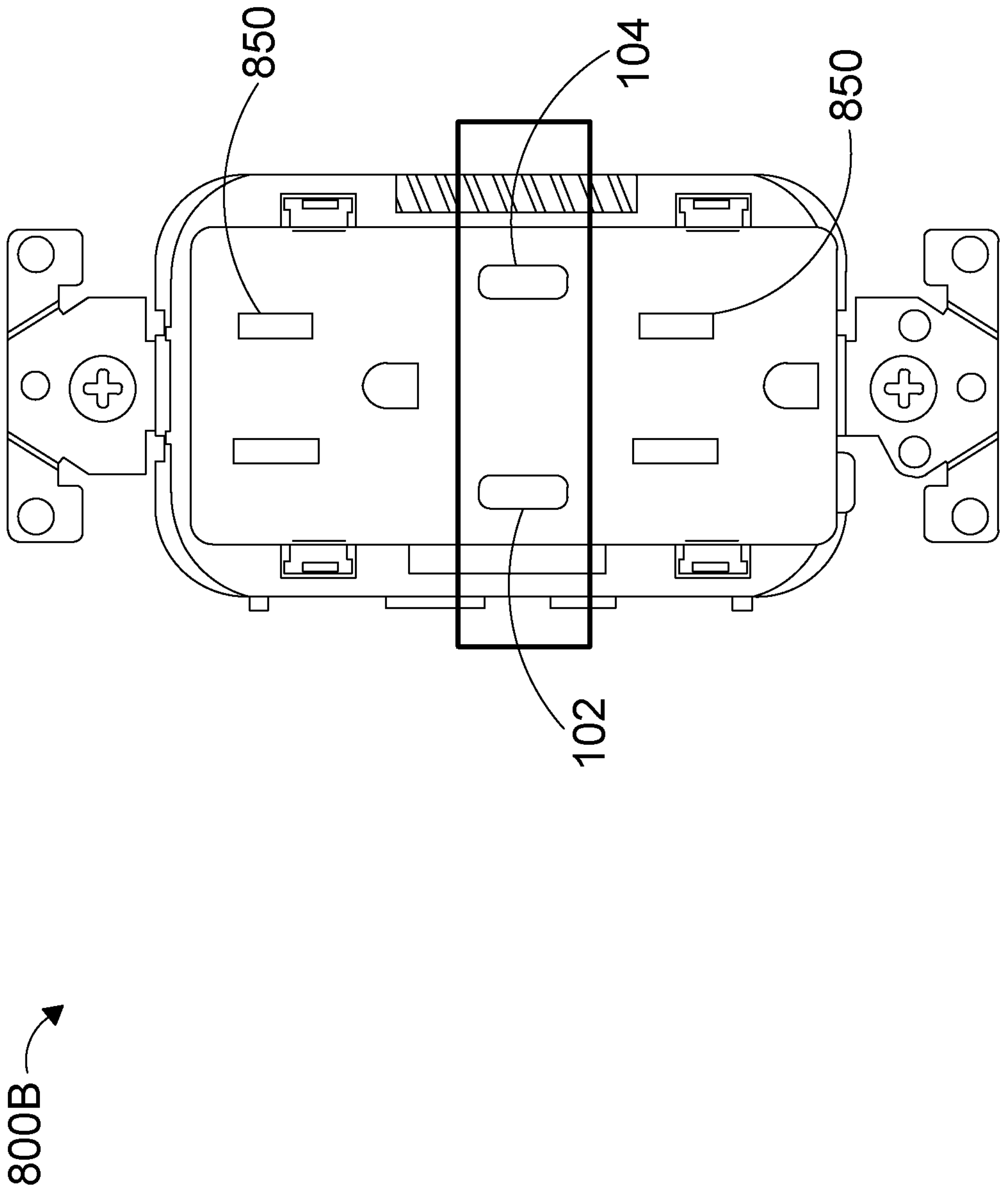
FIG. 8B is an illustration of a multiport alternating current (AC) power adapter configured to intelligently distribute power using a firmware-based method, according to some embodiments.

FIG. 8B is an illustration of a multiport AC power adapter 800B configured to dynamically and intelligently distribute power using a firmware-based method according to one embodiment. In some embodiments, multiport AC power adapter 800B can be a wall power adapter that includes a master port 102, a slave port 104, and power ports 850. The master port 102 can be controlled by a master controller (not shown in FIG. 11B), and the slave port 104 can be controlled by a slave controller (not shown in FIG. 11B). AC-DC converters (not shown) can convert an input AC supply voltage to a DC voltage to be supplied to the master controller and the slave controller. In some embodiments, multiport AC power adapter 800B can be configured to implement operations to distribute a system power between the master port 102 and the slave port 104 while each port 850 can supply a fixed port power. In other embodiments, the ports 850 can be configured as slave ports, and multiport AC power adapter 800B can be configured to implement operations to distribute a system power between the master port 102, the slave port 104, and the ports 850. Although illustrated as a wall adapter in FIG. 8B, the multiport AC power adapter 800B can be another type of multiport AC power adapter, such as could be found in a vehicle, car, truck, van, boat, plane, building, house, or the like.

Figure 9:
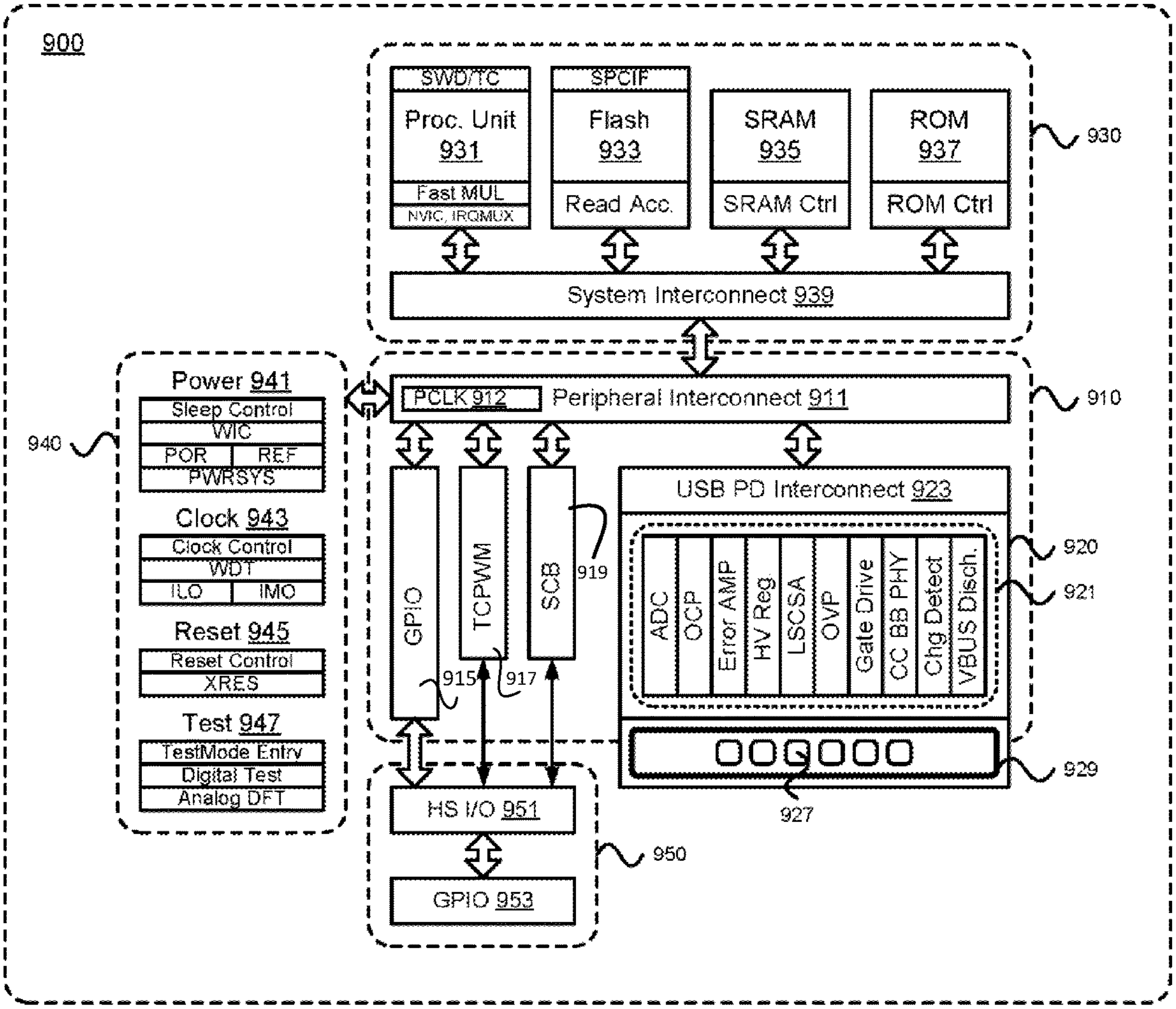
FIG. 9 is a block diagram illustrating a system for a USB-enabled device, according to some embodiments.

FIG. 9 is a block diagram illustrating a system 900 for a USB device for use in USB power delivery in accordance with some embodiments. System 900 may include a peripheral subsystem 910 including a number of components for use in USB Power Delivery (USB-PD). Peripheral subsystem 910 may include a peripheral interconnect 911 including a clocking module, peripheral clock (PCLK) 912 for providing clock signals to the various components of peripheral subsystem 910. Peripheral interconnect 911 may be a peripheral bus, such as a single-level or multi-level advanced high-performance bus (AHB), and may provide a data and control interface between peripheral subsystem 910, CPU subsystem 930, and system resources 940. Peripheral interconnect 911 may include controller circuits, such as direct memory access (DMA) controllers, which may be programmed to transfer data between peripheral blocks without input by, control of, or burden on CPU subsystem 930.

The peripheral interconnect 911 may be used to couple components of peripheral subsystem 910 to other components of system 900. Coupled to peripheral interconnect 911 may be a number of general-purpose input/outputs (GPIOs) 915 for sending and receiving signals. GPIOs 915 may include circuits configured to implement various functions such as pull-up, pull-down, input threshold select, input and output buffer enabling/disable, single multiplexing, etc. Still other functions may be implemented by GPIOs 915. One or more timer/counter/pulse-width modulator (TCPWM) 917 may also be coupled to the peripheral interconnect and include circuitry for implementing timing circuits (timers), counters, pulse-width modulators (PWMs) decoders, and other digital functions that may operate on I/O signals and provide digital signals to system components of system 900. Peripheral subsystem 910 may also include one or more serial communication blocks (SCBs) 919 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 910 may include a USB power delivery subsystem 920 coupled to the peripheral interconnect and comprising a set of USB-PD modules 921 for use in USB power delivery. USB-PD modules 921 may be coupled to the peripheral interconnect 911 through a USB-PD interconnect 923. USB-PD modules 921 may include an analog-to-digital conversion (ADC) module for converting various analog signals to digital signals; an error amplifier (AMP) regulating the output voltage on VBUS line per a PD contract; a high-voltage (HV) regulator for converting the power source voltage to a precise voltage (such as 3.5-5V) to power system 900; a low-side current sense amplifier (LSCSA) for measuring load current accurately, an over voltage protection (OVP) module and an over-current protection (OCP) module for providing over-current and over-voltage protection on the VBUS line with configurable thresholds and response times; one or more gate drivers for external power field effect transistors (FETs) used in USB power delivery in provider and consumer configurations; and a communication channel PHY (CC BB PHY) module for supporting communications on a Type-C communication channel (CC) line. USB-PD modules 921 may also include a charger detection module for determining that a charging circuit is present and coupled to system 900 and a VBUS discharge module for controlling discharge of voltage on VBUS. The discharge control module may be configured to couple to a power source node on the VBUS line or to an output (power sink) node on the VBUS line and to discharge the voltage on the VBUS line to the desired voltage level (i.e., the voltage level negotiated in the PD contract). USB power delivery subsystem 920 may also include pads 927 for external connections and electrostatic discharge (ESD) protection circuitry 929, which may be required on a Type-C port. USB-PD modules 921 may also include a bi-directional communication module for supporting bi-directional communications with another controller, such as between a primary-side controller and a secondary-side controller of a flyback converter.

GPIO 915, TCPWM 917, and SCB 919 may be coupled to an input/output (I/O) subsystem 950, which may include a high-speed (HS) I/O matrix 951 coupled to a number of GPIOs 953. GPIOs 915, TCPWM 917, and SCB 919 may be coupled to GPIOs 953 through HS I/O matrix 951.

System 900 may also include a central processing unit (CPU) subsystem 930 for processing commands, storing program information, and data. CPU subsystem 930 may include one or more processing units 931 for executing instructions and reading from and writing to memory locations from a number of memories. Processing unit 931 may be a processor suitable for operation in an integrated circuit (IC) or a system-on-chip (SOC) device. In some embodiments, processing unit 931 may be optimized for low-power operation with extensive clock gating. In this embodiment, various internal control circuits may be implemented for processing unit operation in various power states. For example, processing unit 931 may include a wake-up interrupt controller (WIC) configured to wake the processing unit up from a sleep state, allowing power to be switched off when the IC or SOC is in a sleep state. CPU subsystem 930 may include one or more memories, including a flash memory 933, and static random-access memory (SRAM) 935, and a read-only memory (ROM) 937. Flash memory 933 may be a non-volatile memory (NAND flash, NOR flash, etc.) configured for storing data, programs, and/or other firmware instructions. Flash memory 933 may include a read accelerator and may improve access times by integration within CPU subsystem 930. SRAM 935 may be a volatile memory configured for storing data and firmware instructions accessible by processing unit 931. ROM 937 may be configured to store boot-up routines, configuration parameters, and other firmware parameters and settings that do not change during operation of system 900. SRAM 935 and ROM 937 may have associated control circuits. Processing unit 931 and the memories may be coupled to a system interconnect 939 to route signals to and from the various components of CPU subsystem 930 to other blocks or modules of system 900. System interconnect 939 may be implemented as a system bus such as a single-level or multi-level AHB. System interconnect 939 may be configured as an interface to couple the various components of CPU subsystem 930 to each other. System interconnect 939 may be coupled to peripheral interconnect 911 to provide signal paths between the components of CPU subsystem 930 and peripheral subsystem 910.

System 900 may also include a number of system resources 940, including a power module 941, a clock module 943, a reset module 945, and a test module 947. Power module 941 may include a sleep control module, a wake-up interrupt control (WIC) module, a power-on-reset (POR) module, a number of voltage references (REF), and a PWRSYS module. In some embodiments, power module 941 may include circuits that allow system 900 to draw and/or provide power from/to external sources at different voltage and/or current levels and to support controller operation in different power states, such as active, low-power, or sleep. In various embodiments, more power states may be implemented as system 900 throttles back operation to achieve a desired power consumption or output. Clock module 943 may include a clock control module, a watchdog timer (WDT), an internal low-speed oscillator (ILO), and an internal main oscillator (IMO). Reset module 945 may include a reset control module and an external reset (XRES) module. Test module 947 may include a module to control and enter a test mode as well as testing control modules for analog and digital functions (digital test and analog DFT).

System 900 may be implemented in a monolithic (e.g., single) semiconductor die. In other embodiments, various portions or modules of system 900 may in implemented on different semiconductor dies. For example, memory modules of CPU subsystem 930 may be on-chip or separate. In still other embodiments, separate-die circuits may be packaged into a single multi-chip module, or remain separate and disposed on a circuit board (or in a USB cable connector) as separate elements.

System 900 may be implemented in a number of application contexts to provide USB-PD functionality thereto. In each application context, an IC controller or SOC implementing system 900 may be disposed and configured in an electronic device (e.g., a USB-enabled device) to perform operations in accordance with the techniques described herein. In one example embodiment, a system 900 may be disposed and configured in a personal computer (PC) power adapter for a laptop, a notebook computer, etc. In another example embodiment, system 900 may be disposed and configured in a power adapter (e.g., a wall charger) for a mobile electronic device (e.g., a smartphone, a tablet, etc.). In another example embodiment, system 900 may be disposed and configured in a wall socket that is configured to provide power over USB Type-A and/or Type-C port(s). In another example embodiment, system 900 may be disposed and configured in a car charger that is configured to provide power over USB Type-A and/or Type-C port(s). In yet another example embodiment, system 900 may be disposed and configured in a power bank that can get charged and then provide power to another electronic device over a USB Type-A or Type-C port. In other embodiments, a system like system 900 may be configured with the power switch gate control circuitry described herein and may be disposed in various other USB-enabled electronic or electro-mechanical devices.

It should be understood that a system, like system 900 implemented on or as an IC controller may be disposed into different applications, which may differ with respect to the type of power source being used and the direction in which power is being delivered. For example, in the case of a car charger, the power source is a car battery that provides DC power, while in the case of a mobile power adapter the power source is an AC wall socket. Further, in the case of a PC power adapter the flow of power delivery is from a provider device to consumer device, while in the case of a power bank the flow of power delivery may be in both directions depending on whether the power bank is operating as a power provider (e.g., to power another device) or as a power consumer (e.g., to get charged itself). For these reasons, the various applications of system 900 should be regarded in an illustrative rather than a restrictive sense.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "allocating," "dynamically allocating," "redistributing," "ignoring," "reallocating," "detecting," "performing," "polling," "registering," "monitoring," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that can store, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that can store a set of instructions for execution by the machine and that causes the machine to perform any one or more of the methodologies of the present embodiments.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

monitoring, by at least one processing device, power consumption by at least one device of a plurality of devices, wherein each device of the plurality of devices is connected to a port of a plurality of ports, wherein each port of the plurality of ports is allocated a respective allocation of a total amount of system power, and wherein monitoring the power consumption comprises obtaining at least one current measurement of actual current consumption by the at least one device;

determining, by the at least one processing device, whether the at least one current measurement satisfies a threshold condition, further including determining whether the at least one current measurement is greater than a sum of a stored current measurement and a first current measurement threshold, or the at least one current measurement is less than a difference between the stored current measurement and a second current measurement threshold; and responsive to determining that the at least one current measurement satisfies the threshold condition, causing, by the at least one processing device, the total amount of system power to be reallocated such that each port of the plurality of ports is allocated a respective reallocation of the total amount of system power.

2. The method of claim 1, wherein causing the total amount of system power to be reallocated further comprises:

determining at least one amount of power consumed by the at least one device based on at least one Request Data Object (RDO) voltage and the at least one current measurement; and causing the total amount of system power to be reallocated based on the at least one amount of power consumed by the at least one device.

3. The method of claim 1, further comprising:

obtaining, by the at least one processing device, a set of charging characteristics of a given device of the plurality of devices, the given device being connected to a given port of the plurality of ports; and using, by the at least one processing device, the set of charging characteristics to reallocate the total amount of system power.

4. The method of claim 3, wherein:

the given device is a known device;

obtaining the set of charging characteristics further comprises obtaining a charging table and a charging status corresponding to the given device; and using the set of charging characteristics to reallocate the total amount of system power further comprises causing an amount of power to be provided to the given port based on the charging table and the charging status.

5. The method of claim 3, wherein:

the given device is an unknown device;

obtaining the set of charging characteristics further comprises saving a charging pattern corresponding to the given device; and after saving the charging pattern, using the set of charging characteristics to reallocate the total amount of system power further comprises causing an amount of power to be provided to the given port.

6. The method of claim 1, further comprising, prior to monitoring the power consumption by the at least one device:

determining, by the at least one processing device for each device of the plurality of devices, a power requirement for the device; and allocating, by the at least one processing device based on each power requirement, the total amount of system power such that each port of the plurality of ports is allocated the respective allocation of the total amount of system power, independent of a connection sequence of the plurality of devices.

7. A system comprising:

a memory; and at least one processing device, operatively coupled to the memory, to:

monitor power consumption by at least one device of a plurality of devices by obtaining at least one current measurement of actual current consumption by the at least one device, wherein each device of the plurality of devices is connected to a port of a plurality of ports, and wherein each port of the plurality of ports is allocated a respective allocation of a total amount of system power;

determine whether the at least one current measurement satisfies a threshold condition;

responsive to determining that the at least one current measurement satisfies the threshold condition, cause the total amount of system power to be reallocated such that each port of the plurality of ports is allocated a respective reallocation of the total amount of system power; and determine whether the at least one current measurement satisfies the threshold condition by determining whether the at least one current measurement is greater than a sum of a stored current measurement and a first current measurement threshold, or the at least one current measurement is less than a difference between the stored current measurement and a second current measurement threshold.

8. The system of claim 7, wherein the at least one processing device is further to cause the total amount of system power to be reallocated by:

determining at least one amount of power consumed by the at least one device based on at least one Request Data Object (RDO) voltage and the at least one current measurement; and causing the total amount of system power to be reallocated based on the at least one amount of power consumed by the at least one device.

9. The system of claim 7, wherein the at least one processing device is further to:

obtain a set of charging characteristics of a given device of the plurality of devices, the given device being connected to a given port of the plurality of ports; and use the set of charging characteristics to reallocate the total amount of system power.

10. The system of claim 9, wherein:

the given device is a known device;

the at least one processing device is to obtain the set of charging characteristics by obtaining a charging table and a charging status corresponding to the given device; and the at least one processing device is to use the set of charging characteristics to reallocate the total amount of system power by causing an amount of power to be provided to the given port based on the charging table and the charging status.

11. The system of claim 9, wherein:

the given device is an unknown device;

the at least one processing device is to obtain the set of charging characteristics by saving a charging pattern corresponding to the given device; and after saving the charging pattern, the at least one processing device is to use the set of charging characteristics to reallocate the total amount of system power by causing an amount of power to be provided to the given port.

12. The system of claim 7, wherein the at least one processing device, prior to monitoring the power consumption by the at least one device, is further to:

determine, for each device of the plurality of devices, a power requirement for the device; and allocate, based on each power requirement, the total amount of system power such that each port of the plurality of ports is allocated the respective allocation of the total amount of system power, independent of a connection sequence of the plurality of devices.

13. A system comprising:

a plurality of Universal Serial Bus Type-C (USB-C) ports, wherein each USB-C port of the plurality of USB-C ports is allocated a respective allocation of a total amount of system power;

a plurality of devices, wherein each device of the plurality of devices is connected to a respective USB-C port of the plurality of USB-C ports; and at least one processing device, operatively coupled to a memory, to:

monitor power consumption by at least one device of the plurality of devices by obtaining at least one current measurement of actual current consumption by the at least one device;

determine whether the at least one current measurement satisfies a threshold condition;

responsive to determining that the at least one current measurement satisfies the threshold condition, cause system power to be reallocated such that each USB-C port of the plurality of USB-C ports is allocated a respective reallocation of the total amount of system power; and determine whether the at least one current measurement satisfies the threshold condition by determining whether the at least one current measurement is greater than a sum of a stored current measurement and a first current measurement threshold, or the at least one current measurement is less than a difference between the stored current measurement and a second current measurement threshold.

14. The system of claim 13, wherein the at least one processing device is further to cause the total amount of system power to be reallocated by:

determining at least one amount of power consumed by the at least one device based on at least one Request Data Object (RDO) voltage and the at least one current measurement; and causing the total amount of system power to be reallocated based on the at least one amount of power consumed by the at least one device.

15. The system of claim 13, wherein the at least one processing device is further to:

obtain a set of charging characteristics of a given device of the plurality of devices, the given device being connected to a given USB-C port of the plurality of USB-C ports; and use the set of charging characteristics to reallocate the total amount of system power.

16. The system of claim 15, wherein:

the given device is a known device;

the at least one processing device is to obtain the set of charging characteristics by obtaining a charging table and a charging status corresponding to the given device; and the at least one processing device is to use the set of charging characteristics to reallocate the total amount of system power by causing an amount of power to be provided to the given USB-C port based on the charging table and the charging status.

17. The system of claim 15, wherein:

the given device is an unknown device;

the at least one processing device is to obtain the set of charging characteristics by saving a charging pattern corresponding to the given device; and after saving the charging pattern, the at least one processing device is to use the set of charging characteristics to reallocate the total amount of system power by causing an amount of power to be provided to the given USB-C port.

* * * * *